United States Patent [19]
Porter et al.

[11] 3,976,977
[45] Aug. 24, 1976

[54] PROCESSOR FOR INPUT-OUTPUT PROCESSING SYSTEM

[75] Inventors: Marion G. Porter, Phoenix; Garvin Wesley Patterson, Glendale; William A. Shelly; Nicolas S. Lemak, both of Phoenix, all of Ariz.

[73] Assignee: Honeywell Information Systems, Inc., Phoenix, Ariz.

[22] Filed: Mar. 26, 1975

[21] Appl. No.: 562,317

[52] U.S. Cl. .............................................. 340/172.5
[51] Int. Cl.² .................... G06F 3/00; G06F 15/20
[58] Field of Search ................................ 340/172.5

[56] References Cited
UNITED STATES PATENTS
3,909,799  9/1975  Recks et al. .................... 340/172.5

Primary Examiner—Gareth D. Shaw
Assistant Examiner—James D. Thomas
Attorney, Agent, or Firm—David A. Frank

[57] ABSTRACT

An input-output processing system (IOPS) which performs both the communication and control functions in a large scale data processing system is disclosed. By relieving the main data processor of these functions more efficient use of the entire system is made possible. The IOPS includes a processor to develop addresses for a paged memory and institute execution of input-output command sequences.

8 Claims, 20 Drawing Figures

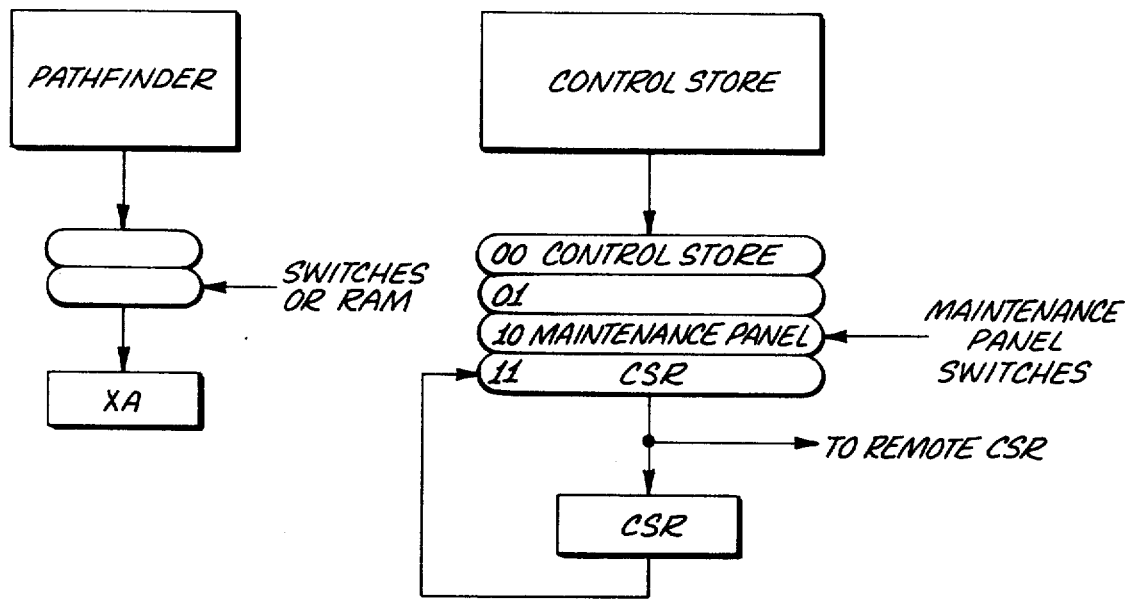
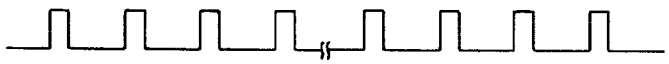
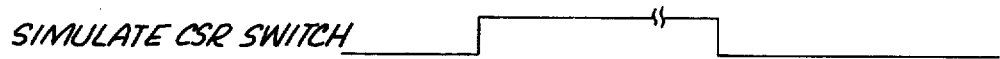
Fig. 3

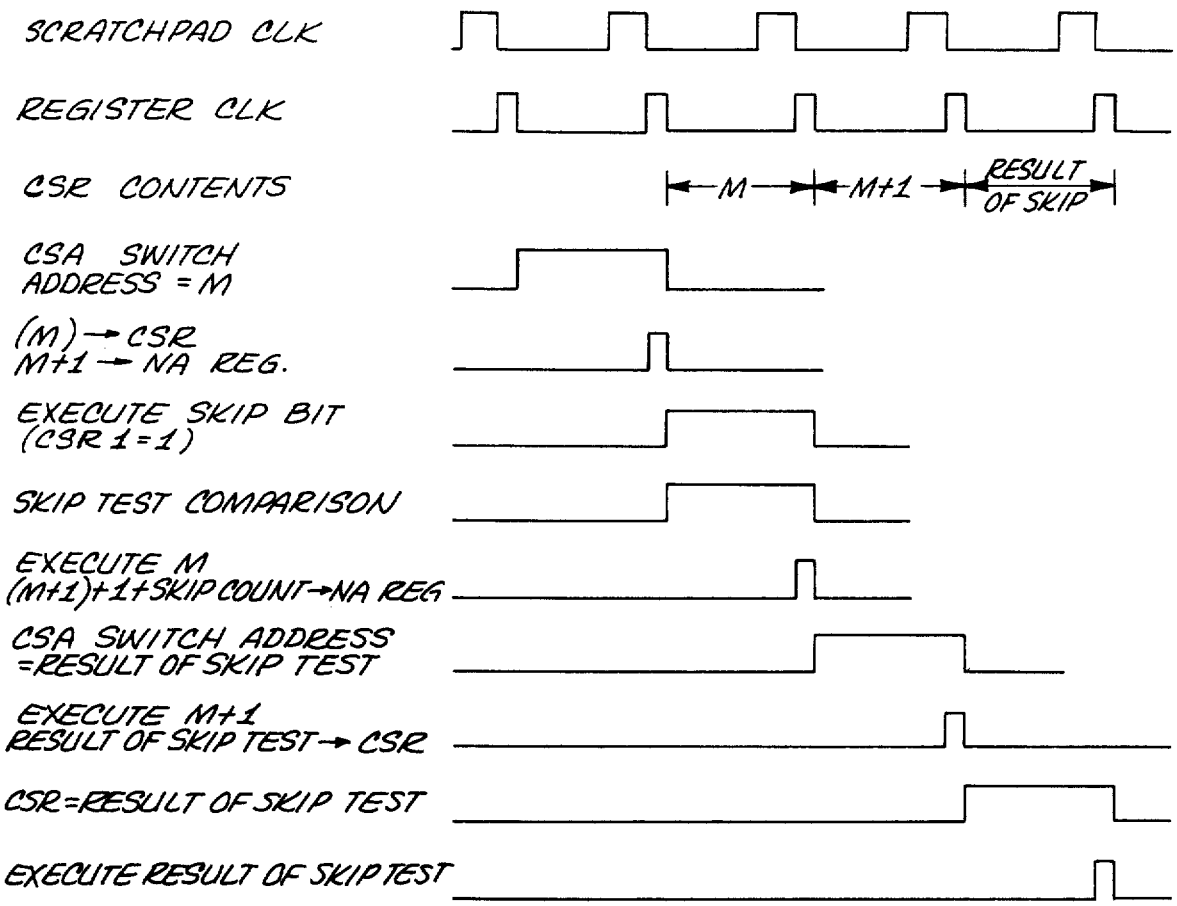
SKIP TEST EXECUTION
MICROINSTRUCTION AT ADDRESS M EXECUTES SKIP TEST
FIG. 7
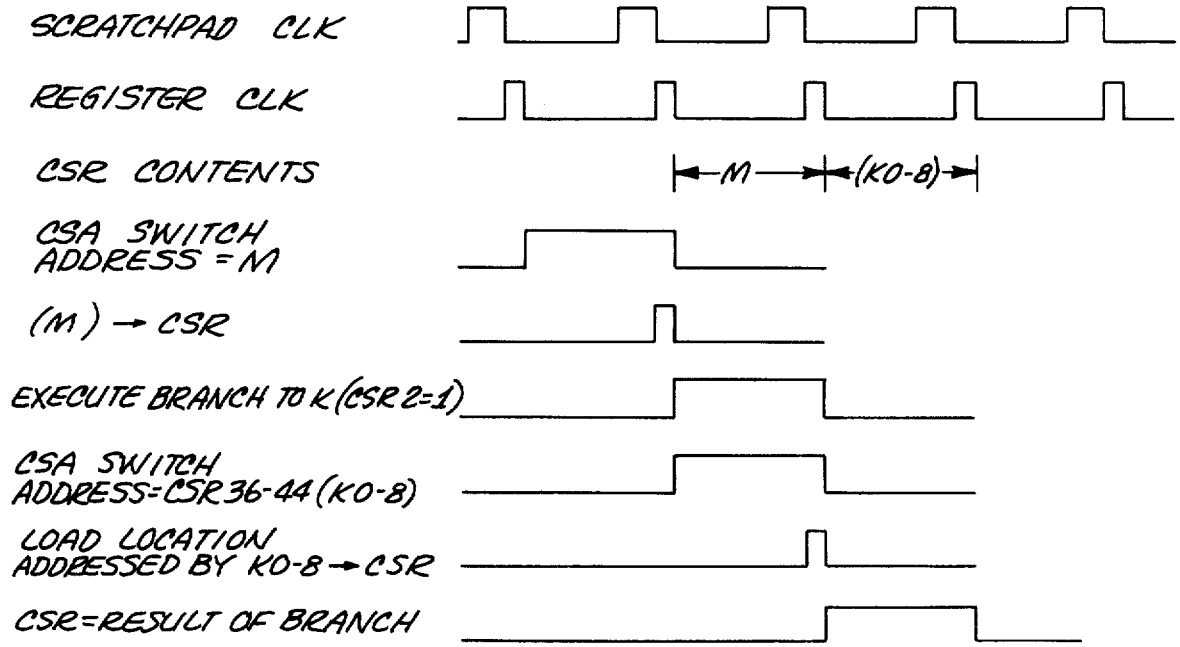
FIG. 8  BRANCH TO CONSTANT

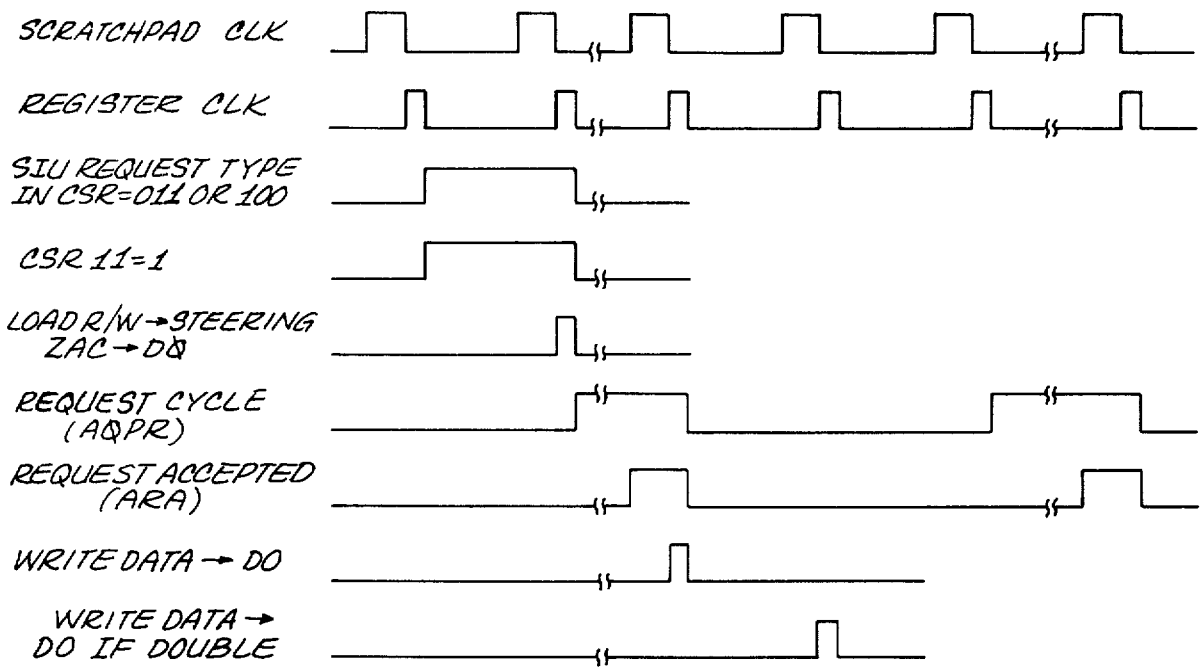
FIG-9 WRITE SINGLE/DOUBLE TO R/W MEMORY
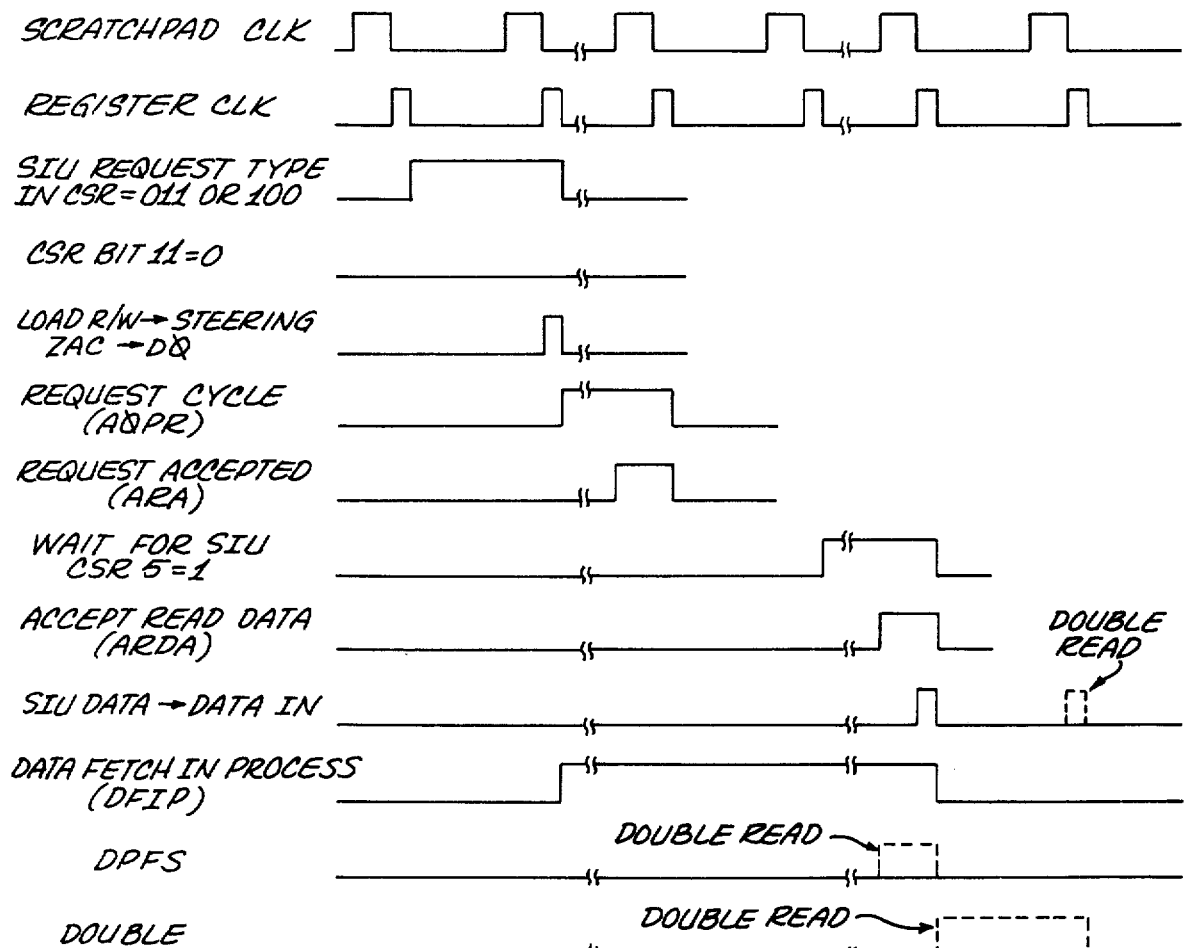
FIG-10 READ SINGLE/DOUBLE FROM R/W MEMORY

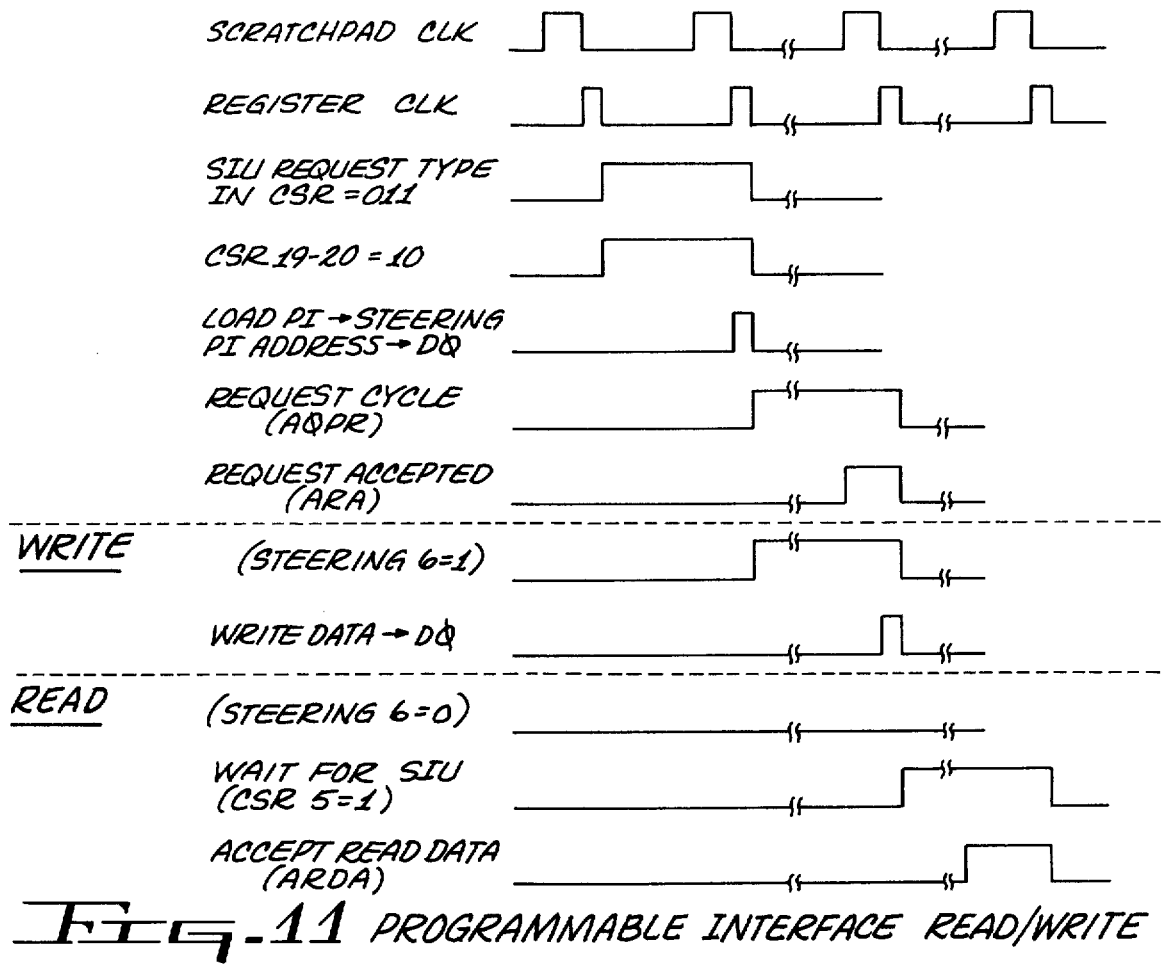
Fig. 11 PROGRAMMABLE INTERFACE READ/WRITE
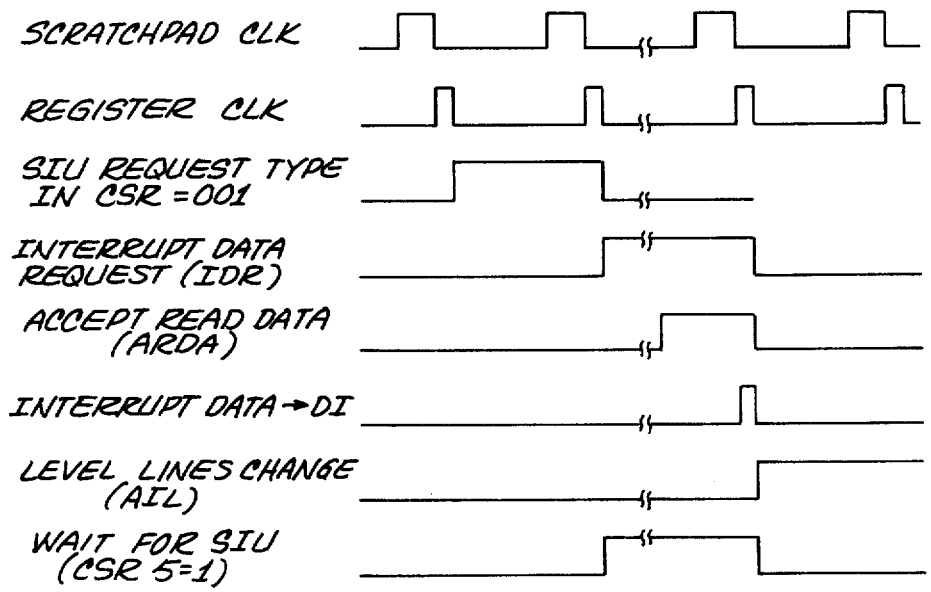
Fig. 12 REQUEST INTERRUPT DATA

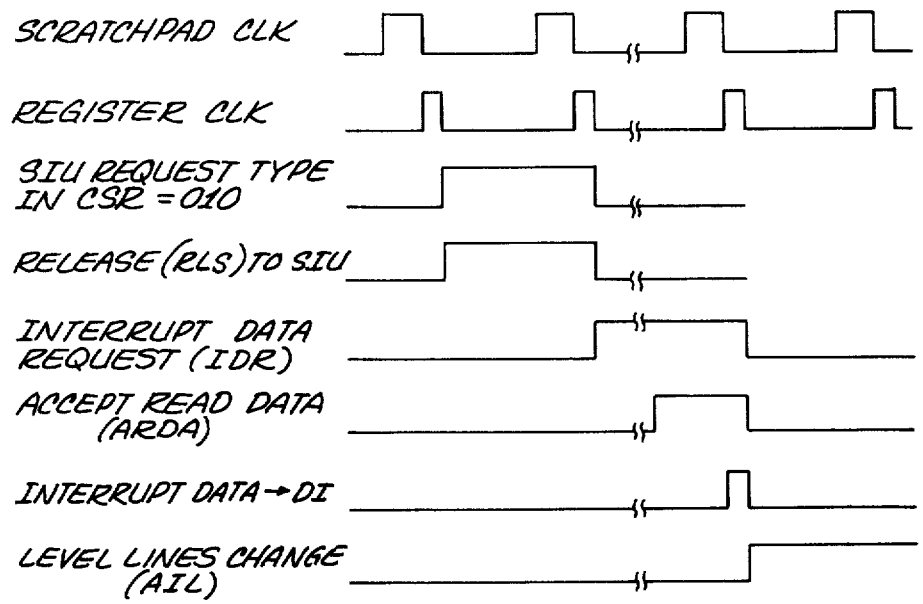
FIG. 13 RELEASE & REQUEST INTERRUPT DATA
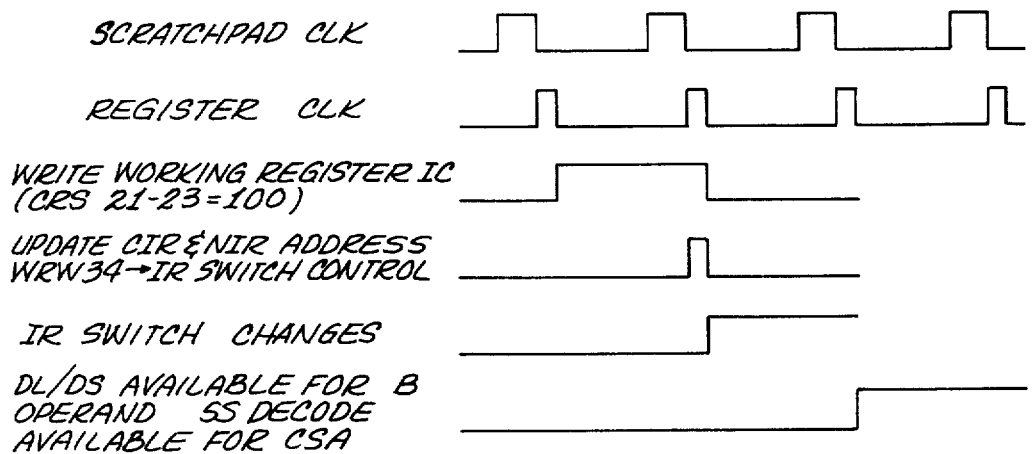
FIG. 14 INSTRUCTION REGISTER READ ADDRESS UPDATE

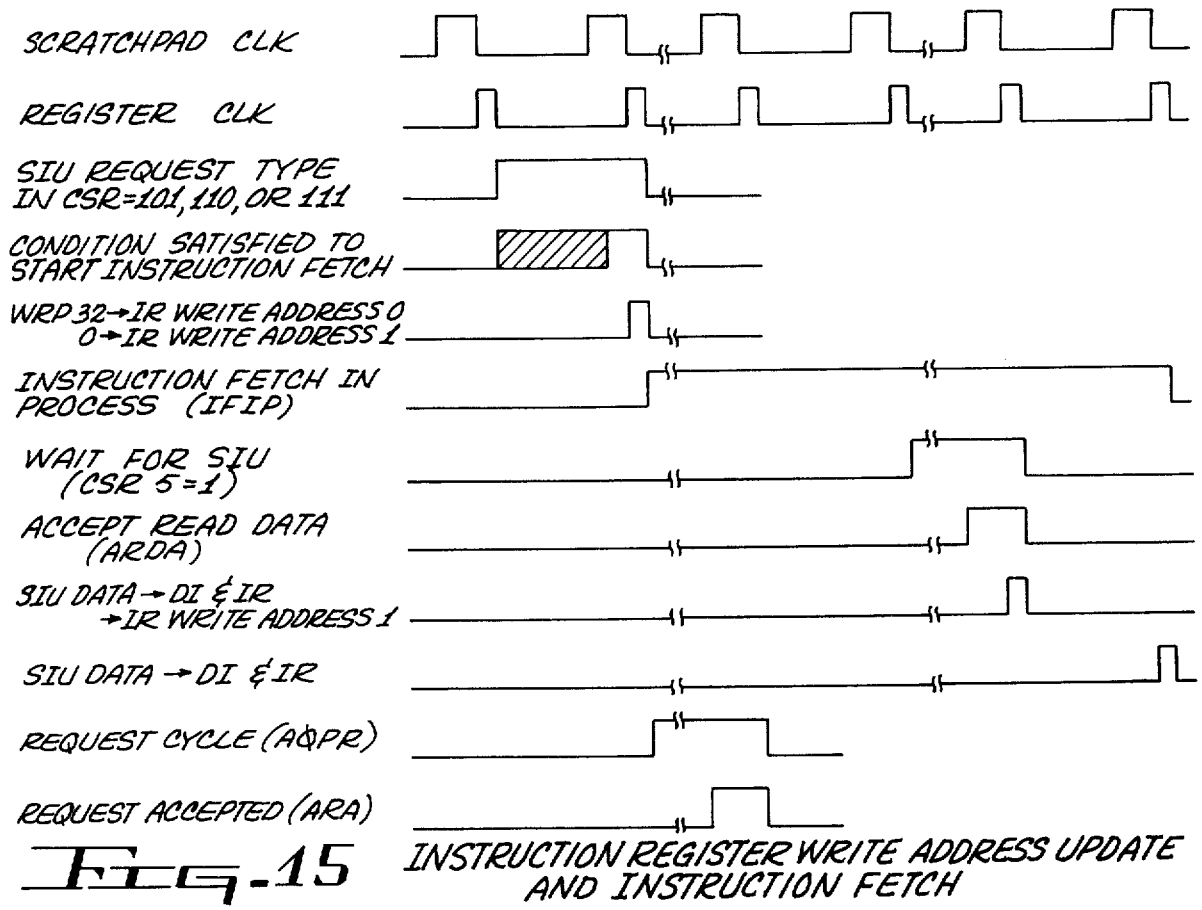
FIG. 15 INSTRUCTION REGISTER WRITE ADDRESS UPDATE AND INSTRUCTION FETCH
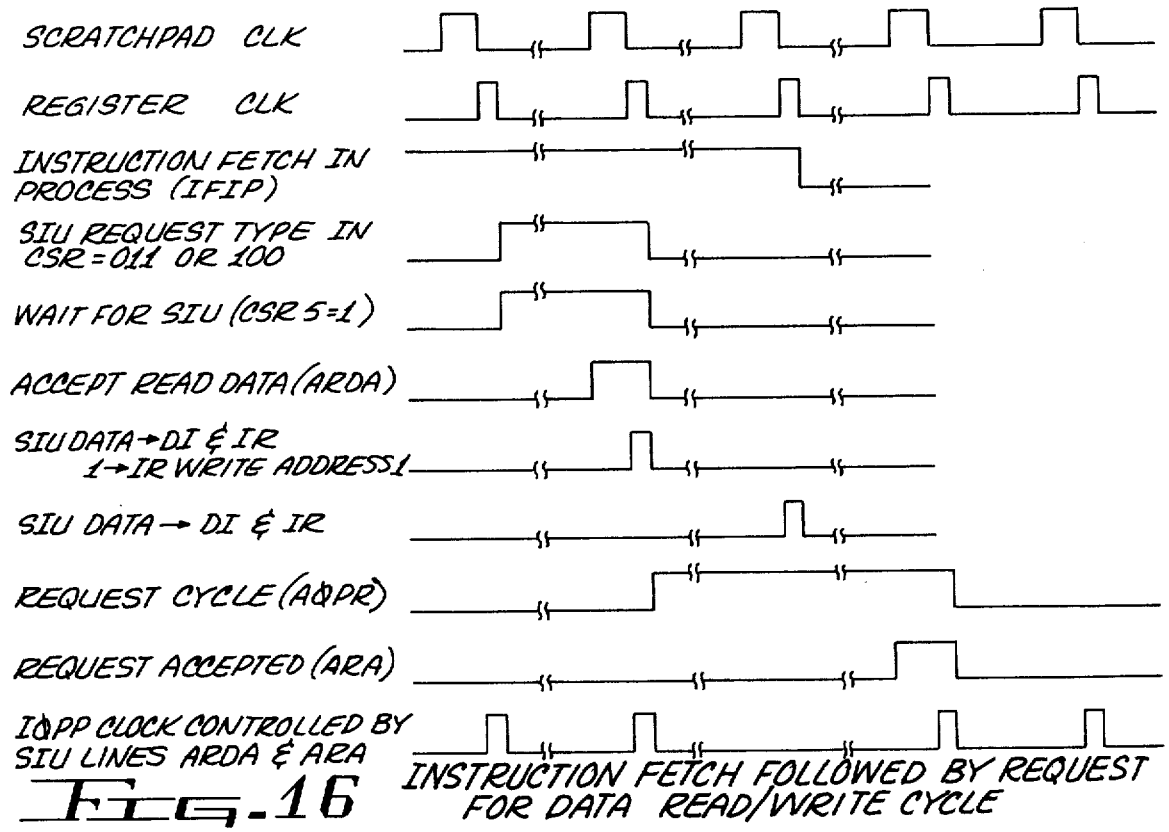
FIG. 16 INSTRUCTION FETCH FOLLOWED BY REQUEST FOR DATA READ/WRITE CYCLE

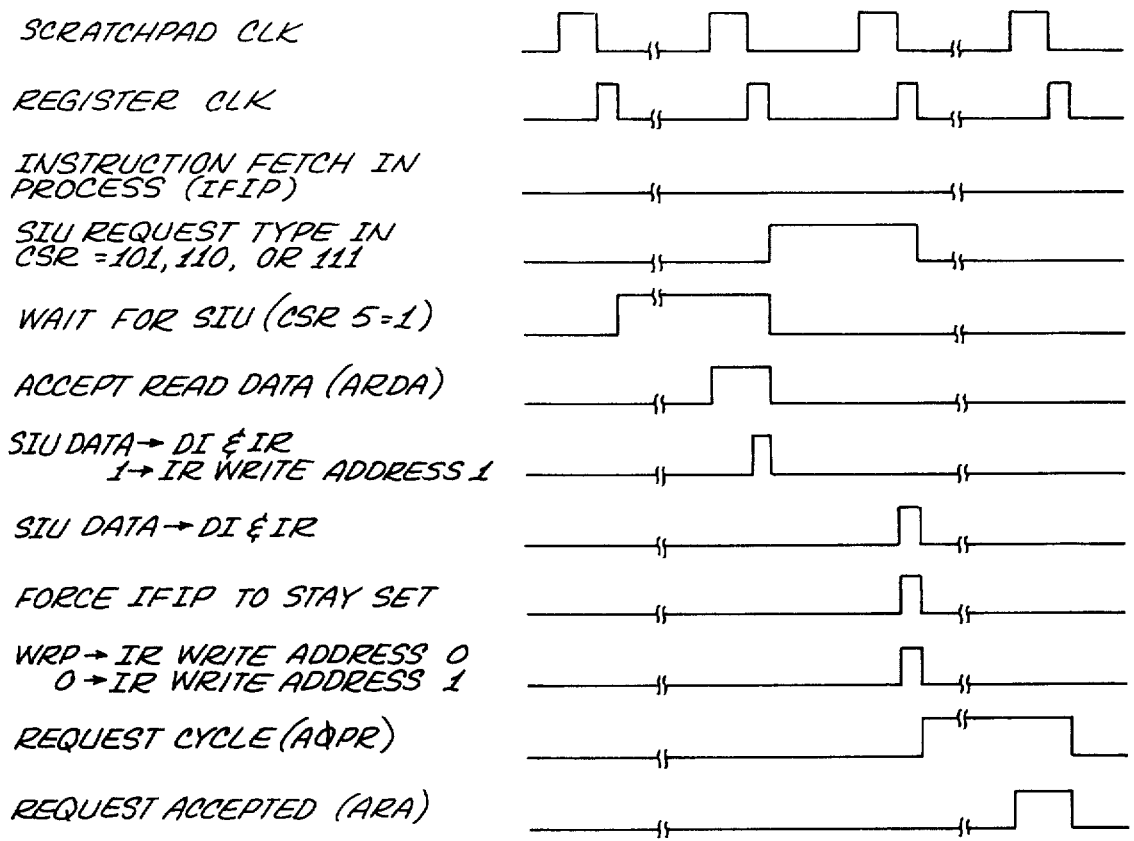
FIG. 17 INSTRUCTION REQUEST FOLLOWED BY REQUEST FOR ANOTHER INSTRUCTION READ CYCLE
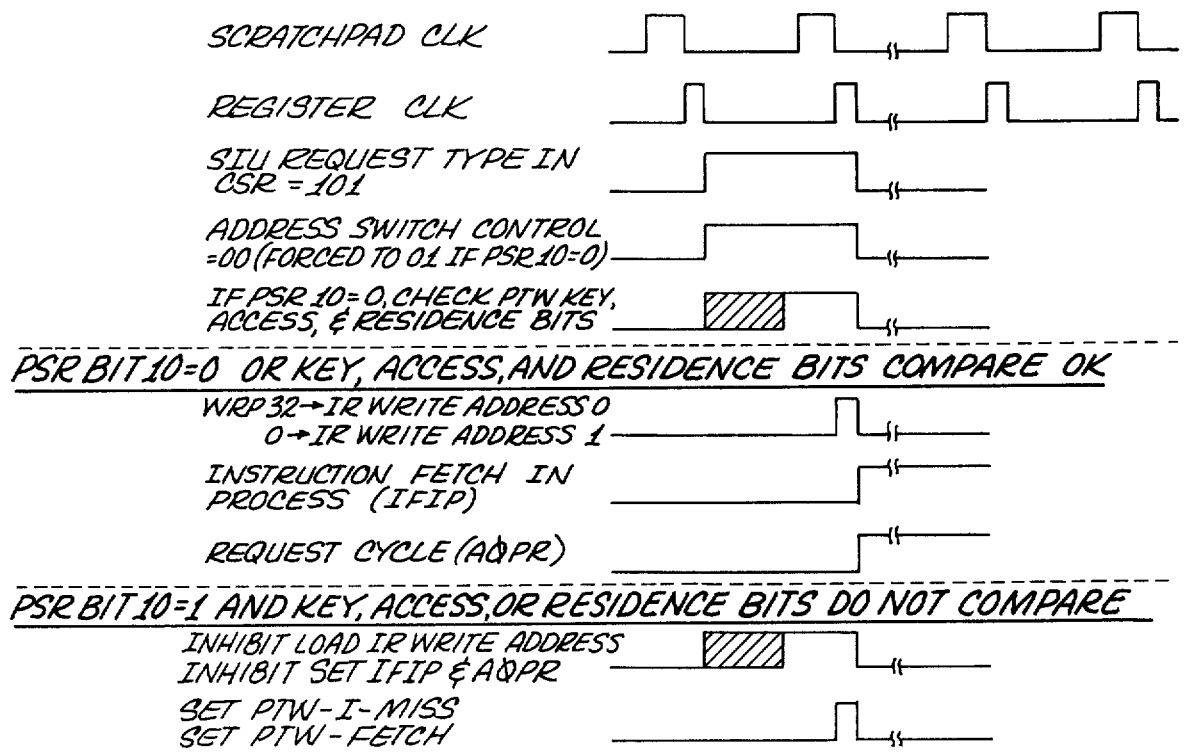
FIG. 18 START UNCONDITIONAL INSTRUCTION FETCH

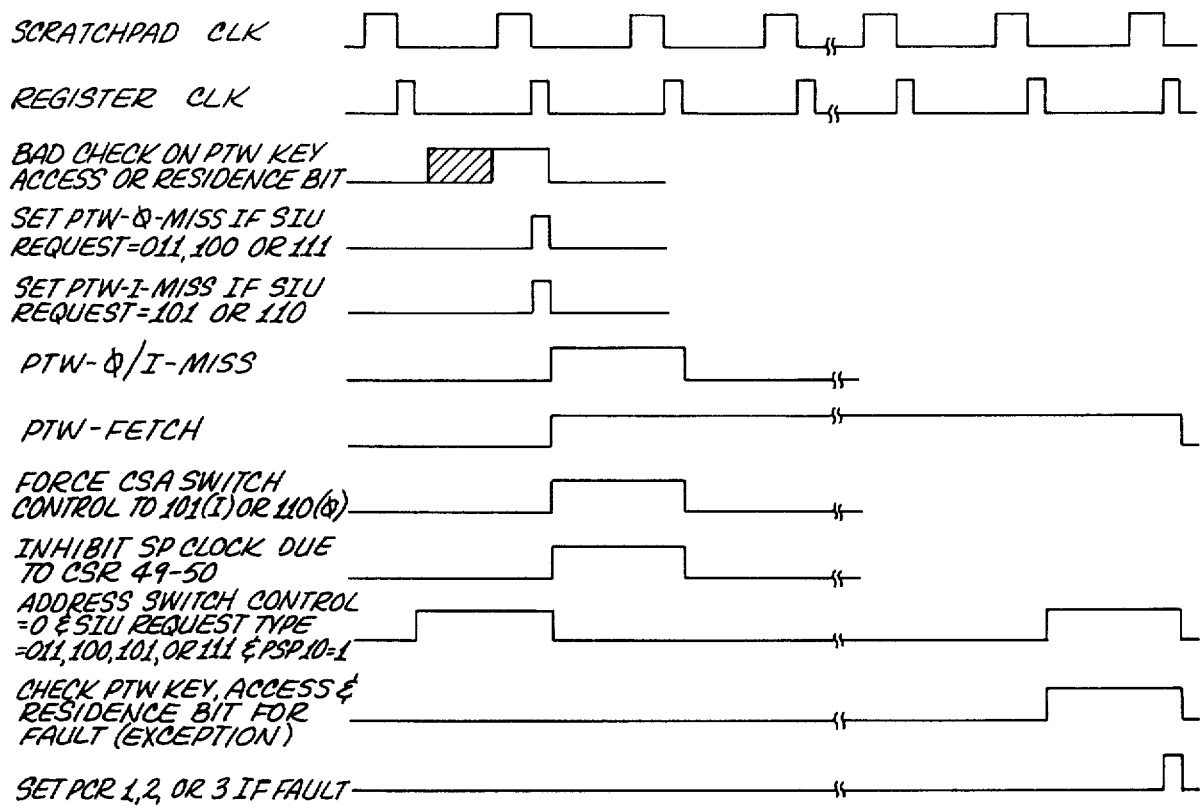
FIG. 19 FORCE ENTRY INTO PTW MISS SEQUENCE
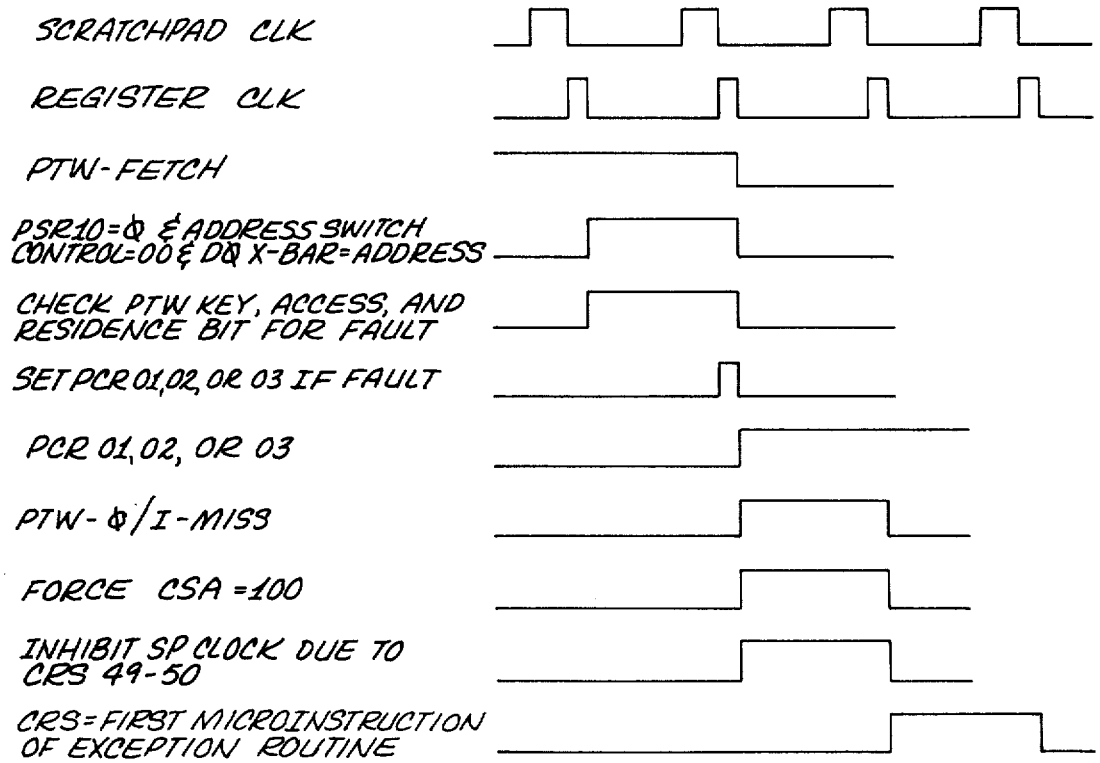
FIG. 20 PAGE TABLE WORD FAULT

PROCESSOR FOR INPUT-OUTPUT PROCESSING SYSTEM

TABLE OF CONTENTS

| | Col. No. |
|---|---|
| BACKGROUND OF THE INVENTION | 2 |
| SUMMARY OF THE INVENTION | 2 |
| BRIEF DESCRIPTION OF THE DRAWINGS | 3 |
| DESCRIPTION OF PREFERRED EMBODIMENT | 3 |
|    Input/Output System | 3 |
|    General Description of Processor | 4 |
|    Component Description | 5 |
|    General Register Scratchpad | 5 |
|    A and B Operand Switches | 6 |
|    Adder/Shifter Network | 7 |
|    PTW Scratchpad | 8 |
|    Address and Steering Switch | 9 |
|    Result-XBAR | 10 |
|    Working Registers | 10 |
|    PSR/PCR—Process State Register/Process Control Register | 10 |
|    Control Store Addressing and Sequencing | 12 |
|    Control Store Output Register | 14 |
| DATA FORMATS | 16 |
| REGISTER FORMATS | 17 |
| EXCEPTIONS | 21 |
| INTERRUPTS | 22 |
| ADDRESS DEVELOPMENT | 24 |
| INSTRUCTION SUMMARY | 27 |
| IMMEDIATE OPERAND INSTRUCTIONS | 32 |
| SHIFT INSTRUCTIONS | 35 |
| BIT FIELD INSTRUCTIONS | 36 |
| BRANCH INTRUCTIONS | 39 |
|    Timing Diagrams | 39 |
| PROGRAM LISTING | 41 |
| CLAIMS | 41-44 |

CROSS REFERENCE TO RELATED COPENDING APPLICATIONS

The following copending applications relate to the present application and are incorporated herein by reference:

5202529    Serial No. 562,330    Filed March 26, 1975
"METHOD OF GENERATING ADDRESSES TO A PAGED MEMORY"
  Inventors:    Garvin Wesley Patterson
                Marion G. Porter
5202536    Serial No. 562,313    Filed March 26, 1975
"MEMORY STEERING IN A DATA PROCESSING SYSTEM"
  Inventor:    William A. Shelly
5202531    Serial No. 559,115    Filed March 17, 1975
"DATA ALIGNMENT CIRCUIT"
  Inventor:    Darrell L. Fett
5202552    Serial No. 562,315    Filed March 26, 1975
"PRIORITY INTERRUPT MECHANISM"
  Inventors:    Ernest M. Monahan
                Garvin Wesley Patterson
                Jaime Calle
5202553    Serial No. 562,314    Filed March 26, 1975
"DISPATCHER MECHANISM"
  Inventors:    Ernest M. Monahan
                Garvin Wesley Patterson
5202554    Serial No. 562,361    Filed March 26, 1975
"FAIL SOFT MEMORY"
  Inventors:    Marion G. Porter
                Jaime Calle
                Garvin Wesley Patterson
5202573    Serial No. 562,272    Filed March 26, 1975
"INSTRUCTION LOOK AHEAD HAVING PREFETCH CONCURRENCY AND PIPELINE FEATURES"
  Inventor:    Marion G. Porter and Garvin Wesley Patterson
5202533    Serial No. 562,364    Filed March 26, 1975
"PROGRAMMABLE INTERFACE APPARATUS AND METHOD"
  Inventors:    Garvin Wesley Patterson
                William A. Shelly
                Jaime Calle
                Ernest M. Monahan
5202532    Serial No. 562,362    Filed March 26, 1975

-continued
"STEERING CODE GENERATING APPARATUS FOR USE IN AN INPUT/OUTPUT PROCESSING SYSTEM"
  Inventors:    Garvin Wesley Patterson
                William A. Shelly
                Ernest M. Monahan
5202534    Serial No. 562,363    Filed March 26, 1975
"A PATHFINDER MICROPROGRAM CONTROL SYSTEM"
  Inventors:    Garvin Wesley Patterson
                Marion G. Porter

BACKGROUND OF THE INVENTION

This invention relates generally to data processing systems, and more particularly to a processor for use in an input/output processing system.

In the prior art, large multi-dimensional, multiprocessor data processing systems utilize input/output processing systems for interfacing peripheral devices and the main processing unit. Such input/output systems are required for establishing data rate compatibility, addressing, and general data exchange control.

In the Honeywell 6000 Series large computer systems, for example, peripheral devices are connected to and controlled by microprogrammed peripheral controllers (MPC) which, in turn, are connected to the main processing units through input/output multiplexers (IOM).

The IOM is the coordinator of all input/output operations between the complement of peripheral subsystems and the main processor unit controller. The IOM operates essentially as a hard wired program device controlled by, and sharing memory with, a main processor. Data transfers between a peripheral device and main memory are accomplished by the IOM while the processor runs the jobs. The IOM includes a plurality of data channels for communicating with peripheral devices and a central channel which controls access to main storage for each of the data channels. The data channels include common peripheral interface (CPI) channels having a transfer rate in excess of 650,000 characters per second, which interfaces with many lower speed peripheral devices. Additionally, peripheral subsystem interface (PSI) channels have a transfer rate up to 1.3 million characters per second and are used with higher speed peripheral devices such as disks. Further, a direct channel is provided for front-end communication processors and allows data transfers as high as 1 million bytes per second.

External to the IOM and controlling the various peripheral devices are the MPC's for a plurality of high-speed disk devices, magnetic tape controllers, and unit record controllers for low-speed devices such as card readers and printers.

SUMMARY OF THE INVENTION

The present invention relates to an input/output processing system which combines the communication and control functions, thereby relieving the main processor of these functions. More particularly the invention relates to the processor portion of such an input/output processing system.

The basic elements of the IOP system include a system interface unit (SIU), a high-speed multiplexer, a low-speed multiplexer, a local memory, a remote memory adaptor, and a processor. The system interface unit provides connections between the elements of the IOP system, and in addition to providing for access of local or remote memory by the active modules, the SIU provides for direct addressing of the multiplexers by the processor.

Subsystem functions not directly involved with high-speed data transfers are performed by the processor. These functions include initiation and termination of I/O command sequences, fetching, checking, and translating channel programs, and direct control of low-speed peripheral devices such as unit record and data communications equipment.

Accordingly, an object of the present invention is a processor for use with an input/output processing system.

Another object of the invention is a processor for input/output functions including absolute address development for paged memory storage.

The invention and objects and features thereof will be more fully understood from the following detailed description and appended claims when taken with the drawings.

BRIEF DESCRIPTION OF THE DRAWINGS

FIG. 3 is a block diagram and timing diagram for the local and remote control registers of the processor of FIG. 2;

FIGS. 6 through 20 are illustrative timing diagrams for routine procedures executed in the IOP processor.

DESCRIPTION OF PREFERRED EMBODIMENT

Input/Output System

The input/output system in which the processor of the present invention is employed operates in association with the main processor and memory of a large computer system to provide multiplexing and control of data transfers between peripheral devices (i.e., disk, tape, unit record, communications, etc.). Generally, its functions include the addressing and controlling of data transfers between the peripheral devices and the main memory.

Figure 1:
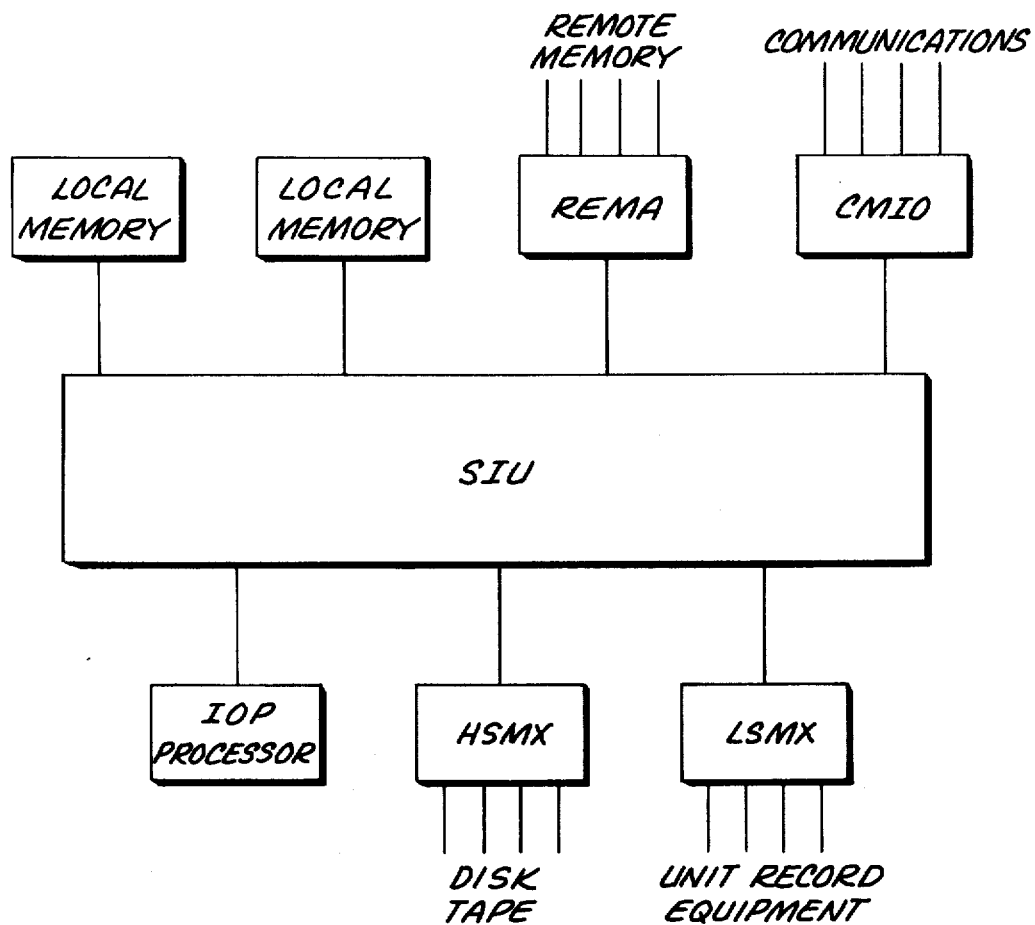
FIG. 1 is a functional block diagram of an input/output system including a processor in accordance with the present invention.

FIG. 1 is a block diagram of an I/O system in which the processor of the present invention is utilized. The central component of the I/O system is the system interface unit (SIU) which provides connections between the various components of the system. In addition to providing for access of local or remote memory by the active modules of the system, the SIU provides for direct addressing of the multiplexers and controller adaptors by the system processor. The SIU also controls the interrupt discipline of the system and performs processor dispatching as required.

System functions not directly involved with high-speed data transfers are performed by the system processor. These functions include initiation and termination of input/output command sequences, fetching, checking, translating channel programs, and direct control of low-speed peripheral devices such as unit record and data communications equipment. As will hereinafter be described in detail, the processor is general purpose including a complement of register-register, register-memory, immediate, branch, bit field, and shift instructions.

The communications input/output (CMIO) provides direct control of data transfers between communications line adaptors and the local IOP memory. Interaction with the IOP/P is necessary for data control.

The local memory in the IOP is organized as a two-port cross-barred read/write store with an optional cache. The remote memory adaptor (REMA) provides a means of exchanging control and data transfers between the IOP and the central system interface units.

The high-speed multiplexer (HSMX) provides direct control of data transfers between high-speed peripheral devices (disk/tape) and central or local memory. The low-speed multiplexer (LSMX) permits direct control by the IOP processor of low-speed devices, including unit record peripherals, consoles, and data communications adaptors.

Disk and tape devices are connected to the high-speed multiplexers by controller adaptors.

Performance and data transfer rates for the I/O system include a local memory cycle time of 140 nanoseconds with cache. The high-speed multiplexer channel rate is 5 megabits per second with a total through-put of a single HSMX of 10 megabytes per second. The low-speed multiplexer through-put is determined by attachments to its device adaptors, with a maximum burst data transfer rate of approximately 70,000 bytes per second. Total maximum input/output transfer rate is 30 megabytes per second for each REMA connected to the SIU.

Each active port of the SIU may include a data interface (DI) and a programmable interface (PI) for the attached device. For example, the HSMX will have a data interface for the high-speed transfer of data and a programmable interface for communication to and from the I/O system processor. The LSMX, on the other hand, has only a PI for data transfers and processor control of the LSMX. System memory port has a shared data and programmable interface.

Memory of the I/O system is paged. Therefore, memory addresses may be virtual or paged addresses or absolute memory addresses. Memory specified by a paged address must be converted by the I/O processor to an absolute address before accessing stored information.

General Description of Processor

Figure 2:
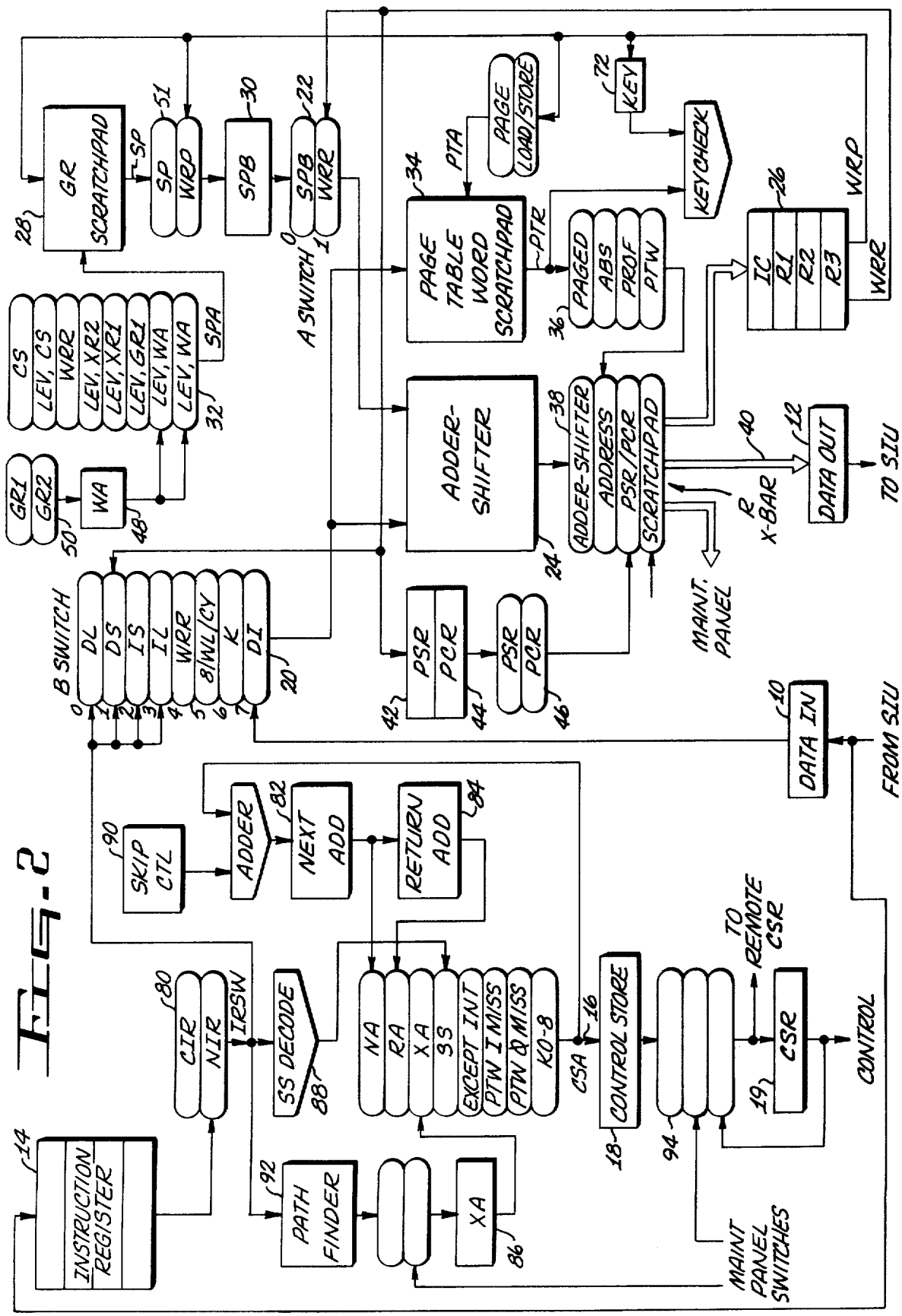
FIG. 2 is a functional block diagram of a processor in accordance with the present invention.

FIG. 2 is a functional block diagram of a processor in accordance with the present invention. Data and instructions from the system interface unit (SIU) are provided at register 10 and processed data is provided to the SIU at data out register 12. As data and instructions are clocked into register 10 a parity check is made and parity errors are noted.

Instructions are placed in a "look ahead" dual read-out register 14 which provides four words of buffering for instructions. An 8-level control store address switch 16 provides an address to control store 18. One level of the CSA switch 16 is provided by the instruction register 14 via pathfinder unit 92. The control store 18 contains the microinstructions which control data manipulations, and an addressed microinstruction is stored in control store register 19.

Data from input register 10 is loaded into one level of the eight-level B switch 20 which, along with two-level A switch 22, provides operands for the adder/shifter network 24. The B switch 20 is controlled by a field in the control store register 19. A switch 22 provides inputs from the dual read-out working registers 26 or from general registers scratch pad 28 via SPB register 30. The dual read-out register 26 contains 3 working registers and an image of the instruction count (IC) contained in the general register scratch pad. The WRR output from working register 26 is supplied to A switch 22, B switch 20, and the PSR/PCR registers 42 and 44; and the WRP output from general register 26 is supplied to the general register scratch pad 28. A seven-bit address for the general register scratch pad is generated in a one of eight switch (SPA) 32.

The adder/shifter network 24 which receives operands from B switch 20 and A switch 22 performs all of the arithmetic, logical, and shift operations required for address development and instruction execution.

A page table word (PTW) scratchpad 34 provides storage of 16 page table words for each of the 8 levels. The four-level address switch 36 concatenates addresses for either programmable interface commands or read/write memory cycles (either paged or absolute).

Output from the adder/shifter network 24 may be supplied through a four-level X-BAR switch 38 to result crossbar (R-XBAR) outputs 40 and to data output register 12. The R-XBAR output provides simultaneous transfer of its inputs to both the data output register 12 and the working registers 26. X-BAR switch 39 also receives inputs from a process state register (PSR) 42, from a process control register (PCR) 44 through switch 46, and from the general register scratchpad 28.

Component Description

Following is a more detailed description of the processor components. Implementation of the components, in accordance with present teachings, lies within the skill of those in the art through use of standard commercially available circuits. For example, the scratchpad memories may comprise conventional 64 bit read/write memories such as Intel 3101 or Texas Instruments SN 7489. The switches or data selectors may comprise a Fairchild 9322 (1 of 2 selector), Fairchild 9309 (1 of 4 selector), or Fairchild 9312 (1 of 8 selector).

The adder and logic unit may comprise Texas Instruments SN 74181 Arithmetic/Logic Unit. While the shifter circuit may be built with conventional TTL circuitry, a preferred embodiment using current mode logic is disclosed in copending application 5202531.

General Register Scratchpad

The General Register (GR) scratchpad 28 contains 128 forty bit register. Each register consists of 4 nine bit bytes with a parity bit per byte. Data written into the scratchpad comes from one of the four working registers on the WRP output of the dual readout register bank used to implement the working registers. Registers included in the scratchpad are a process state register (PSR), an instruction counter (IC), a page table base register (PTBR), and thirteen general registers (GR). The seven bit address for the scratchpad is generated in a one of eight switch (SPA) 32. The switch control inputs are wired directly to the Control Store Output register (CSR) 19. The most significant three bits of the address define one of eight levels and the least significant four bits define one of sixteen registers within the level. The level is supplied by Active Interrupt Level (AIL) lines from the SIU for six of the eight positions. The eight address sources are as follows:

0) Seven bits of the constant field (K2-8) of the CSR which allows addressing any register in any level.

1) The AIL lines and four bits of the CSR constant field (K5-8) which allows addressing any register in the current level.

2) The WRR output of the dual readout working registers bits 29-35. This allows a working register to provide the address for either initialization or software addressing (CSPG or CGSP).

3) The AIL lines and bits 19-22 of the current instruction. This provides the XR2 read address for second level indexing.

4) The AIL lines and bits 14-17 of the current instruction. This provides the XR1 read address for first level indexing or the GR/GR2 read address for operand access.

5) The AIL lines and bits 9-12 of the current instruction. This provides the GR1/GR read address for operand access.

6) The AIL lines and bits 0-2 of the Write Address (WA) register 48 with the least significant bit wired to logical one. This provides the odd address of an even odd pair read or write instruction.

7) The AIL lines and bits 0-3 of the WA register. This provides the address for all software writes into a GR at the current level. This included GR loads and returning execution results to the destination GR.

The output of the scratchpad goes to the one of two switch 51 into the SPB register 52 which is also an input to the Result Crossbar (R-XBAR) 34. The switch into SPB allows operations on a GR and a working register or on two working registers by loading one into SPB. The switch 51 into SPB 52 is controlled by the SP control field in the CSR 19.

The Write Address (WA) register 48 can be loaded from either bits 9-12 or 14-17 of the current instruction. This provides the address for loading a General Register (GR) or returning a result to a GR. This is necessary since the GR address in the instruction being executed is no longer available out of the dual readout Instruction register once the IC is updated. The GR address is therefore saved in WA and used for the write operation by setting a Write (W) flip/flop associated with WA. W resets on the first clock after it is set unless the WA control field in the CSR once again sets it (two word load of GR). A GR scratchpad write clock is generated on all clocks occurring while W is set unless WA=0 in any mode or WA=1 or 15 in slave mode.

SPB register 30 is a forty bit register (four bytes with parity per byte). It provides buffering for words read out of the scratchpad and eliminates the scratchpad access time from the time required for an Adder/Shifter operation. Parity is checked on the data in the SPB register. The SPB load clock is controlled by the CSR SP control field.

A and B Operand Switches

The A and B operand switches provide the two operands for the Adder/Shifter network. A switch 22 selects either SPB or the WRR output of the dual readout working registers. The selection is controlled by a bit in CSR 19. However, the control is forced to select WRR if W is set and the address in WA is equal to XR1. This causes the new value of XR1 or GR2 to be used if the previous instruction modified them. The switch output is forced to logical zeros if the DL position is selected in B switch 20 and no indexing is called for (XR 1=0).

B switch 20 selection is controlled by a three bit field in CSR 19. However, the least significant bit is forced to logical one if the DL position is selected and second level indexing is required (bit 18 of the Instruction = 1). The eight switch positions are formatted as follows:

0) Bits 0-19 are equal to IRSW 19. Bits 20-35 are wired to IRSW 20-35. This is the displacement field for either first level or no indexing.

1) Bits 0-23 are equal to IRSW 23. Bits 24-35 are wired to IRSW 24-35. This is the displacement field for second level indexing.

2) Bits 0-30 are equal to IRSW 8. Bits 31-35 are wired to IRSW 9-13. This is the short immediate value.

3) Bits 0-17 are equal to IRSW 8. Bits 18-35 are wired to IRSW 18-35. This is the long immediate value.

4) This position selects the WRR output of the dual readout working registers.

5) Bits 0-31 are equal to logical zero. Bit 32 is equal to the most significant bit of the CSR constant field. This provides the number 8 for incrementing the IC to point to the next even/odd Instruction pair (8 bytes) in memory. Bit 33 and 34 is equal to the word length in bytes of the current instruction if the two most significant bits of the CSR constant field are zero (10 for word and 01 for half word). Bit 35 is equal to the carry bit in the PSR if the next to most significant bit of the CSR constant field is one.

6) Bits 0-26 are equal to zero. Bits 27-35 are wired to the CSR constant field.

7) This position selects the SIU Data In (DI) register.

Adder/Shifter Network.

Figure 4:
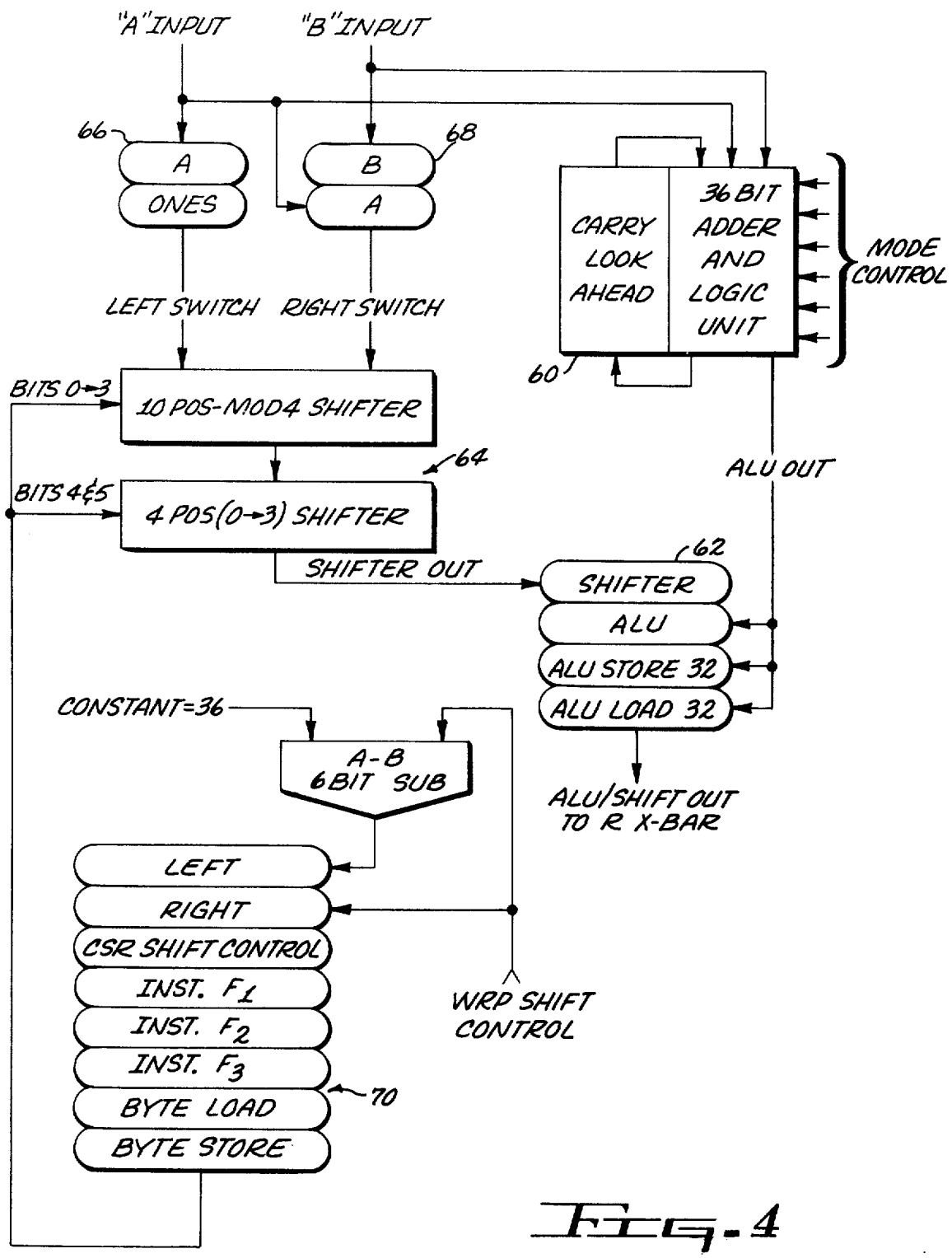
FIG. 4 is a functional block diagram of an adder/shifter unit of the processor of FIG. 2.
Figure 5:
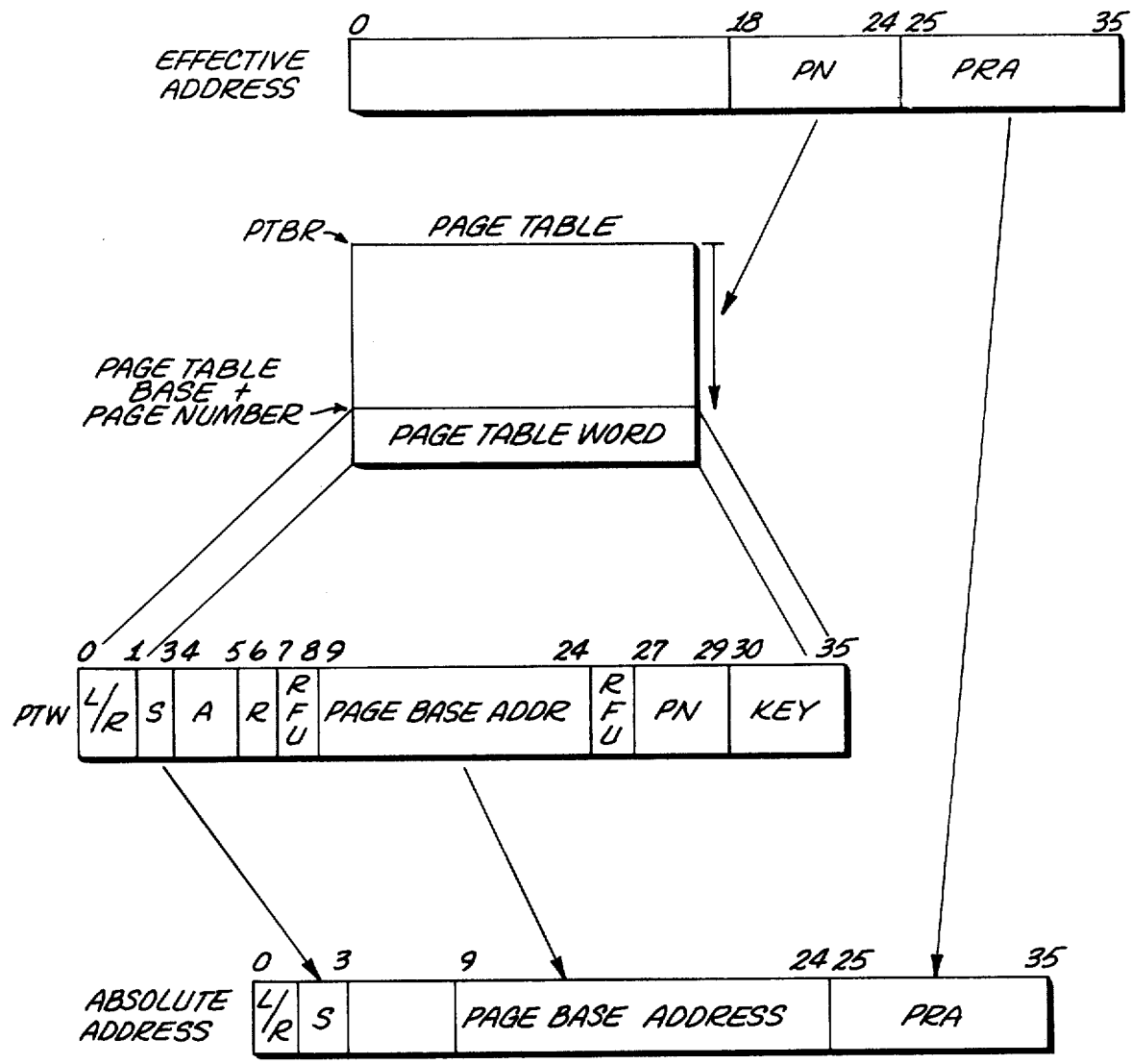
FIG. 5 is a schematic representation of address development as employed by the processor of FIG. 2.

A detailed block diagram of the Adder/Shifter netword is shown in FIG. 4. The Adder-Logical Unit (ALU) 60 executes 36 bit arithmetic and logical operations. It also provides the transfer path for either the A or B operands to the R-XBAR at 62. The ALU operations are controlled by the ALU/Shift input bits in the CSR. The ALU mode is controlled by the least significant bit of the PSR/PCR control bits in the CSR.

The Shifter 64 executes right shifts of 0 to 36 bits. The two input switches 66 and 68 provide the data in the form to execute right or left shifts with the option of inserting either zeros or the sign bit on right shifts. Left shifts are executed by inhibiting the Right switch (logical 0) and selecting the A operand in the Left switch. A shift count is then generated equal to 36 minus the amount to be shifted left. Right shifts are executed by selecting the A operand in the Right switch and either zeros or the sign in the left switch (zeros are generated by inhibiting the switch output).

The shift is executed in two levels. The first level executes mod 4 shifts and the second level shifts 0, 1, 2, or 3. (A 9 bit shift would be executed by shifting two in the first rank and one in the second rank.) Bits 0-3 of the Shift count switch are wired to the shift control inputs of the first rank and bits 4-5 are wired to the least significant two bits of the second rank with most significant two bits of the second rank wired to logical zero.

The shift count switch 70 is controlled by the most significant three bits of the CSR constant field. The positions are as follows:

0) This position selects the difference between 36 and the least significant 6 bits of the dual readout working registers 26 WRP output. This position is used for left shifts.

1) This position selects the least significant 6 bits of the dual readout working registers WRP output. This position is used for right shifts.

2) This position is wired to the least significant 6 bits of the CSR constant field. It is used for shifts when the shift count is defined by control store.

3, 4, and 5) These three positions are wired to the bits 18-23, 24-29, and 30-35 of the current Instruction. They are selected to execute extracts, inserts, and conditional set/reset bits.

6) This position generates the number 27, 18, 9, or 0 when WRP 34-35 is equal to 00, 01, 10 or 11. It is used for extracting a byte from a word as a function of the byte address.

7) This position generates the number 9, 18, 27, or 0 when WRP 34-35 is equal to 00, 01, 10, or 11. It is used for positioning a byte into the proper zone as a function of the byte address.

The ALU/Shifter output switch 62 selects the ALU, Shifter, or 32 bit Store/Load outputs as follows:

0) This position selects the Shifter output.

1) This position selects the ALU output.

2) This position converts a 36 bit word from a GR to a 32 bit format for the Store 32 operation.

3) This position converts a 32 bit format to a 36 bit word prior to loading into a GR for the Load 32 operation.

This switch is controlled by the ALU/Shifter output switch bits in CSR 19. It provides one of the inputs to the R-XBAR. The Condition Code (CC) is generated from the switch output.

PTW Scratchpad

The Page Table Word (PTW) scratchpad 34 provides storage for 16 PTW's for each of the eight levels (128 PTW's). The output of the B operand switch 20 provides the write data into the scratchpad and the write clock is controlled by a bit in the CSR.

The PTW scratchpad address is generated from either the least signifcant 7 bits of the WRP output of the working register 26 or the level and bits 21-24 of the WRP output. The first position is for initialization and GR to PTW transfer. The second position is for reading/loading PTW's while paging addresses and loading missing PTW's. The address selection is controlled by a bit in the CSR.

Each byte of the PTW output is parity checked. The PTW scratchpad output provides input data to two of the four address switch positions. If the PTW output is selected by the Paged position of the Address switch the following checks are made to determine if the PTW is valid (thr priority of the checks for declaring faults is in the order shown):

1) Bits 30-35 of the PTW are compared to a Key register 72. (The Key register identifies the process with which the PTW is associated and is loaded with bits 30-35 of WRP each time GR 15 is loaded.)

2) Bits 27-29 of the PTW are compared with bits 18-20 of WRP. This to verify that the correct PTW is resident in this PTW Scratchpad location. (0, 16, 32, etc. all reside in the same scratchpad location.)

3) The next check is to see if the page is resident in R/W memory. A zero in PTW bit 6 indicates that the page is not resident in memory.

4) If the first three checks pass, bits 4-5 of the PTW are compared with the type of operation being initiated. A data read is always legal. An Instruction fetch requires bit 4 while a write requires bit 5.

If the PTW in the scratchpad fails any of the above checks, it will be accessed from the Page Table in R/W memory and checked again prior to causing an exception.

Address and Steering Switch

The address word for either R/W memory or the Programmable interface is generated in the Address swtich 36. The switch is controlled by the Address switch control bits in the CSR. If the paged position is selected and the PSR reflects the absolute address mode, the absolute position of the switch will be forced so that paging is bypassed. The four positions are as follows:

0) This position generates the pages address to R/W memory. Bit 0 equal to zerodefines a R/W address. Bits 1–3 are provided by the ZAC bits in CSR. Bit 4 is equal to zero . Bits 5–8 are the zone bits and are generated as a function of the R/W memory operation. Reads cause zeros, word or double word writes cause ones, and byte writes cause a one in the byte position to be written. Bits 9–24 are equal to PTW scratchpad 9–24 which is the page base address. Bits 25–35 are equal to WRP 25–35 which is the page relative address. When this position is selected, the WRP output of the working registers must reflect the unpaged address.

1) This position generates the R/W memory address when no paging is required. It can be selected by the CSR or will be forced if position 0 is selected and the PSR reflects the absolute address mode. Bits 0–8 are the same as position 0. Bits 9–35 are equal to WRP 9–35 which must be equal to the absolute memory address when this position is selected.

2) This position generates a Programmable Interfce (PI) command word. Bit 0 equal to one defines a PI command word. Bit 1 is supplied by the CSR ZAC field. Bit 2 is equal to bit 9 of the PSR and defines whether the current program can alter certain external registers. Bit 3 is equal to the processor number supplied by the SIU. Bit 4 is equal to zero. Bits 5–8 are equal to PSR bits 4–7 and define the port within the multiplexer. Bits 9–35 are equal to WRP 9–35 and must be equal to the absolute address generated for either RDEX or WREX.

3) This position provides the path for reading a PTW from the scratchpad.

Bits 0–3 of the address switch are modified to reflect the R/W memory steering during loading of absolute addresses into GR. This requires bits 0–3 to reflect PTW scratchpad 0–3 if paged and WRP 0–3 if absolute address mode. This would be enabled due to position 0 of the address switch being selected and no R/W memory cycle being initiated by the CSR SIU request type control bits.

The steering switch provides the SIU steering for either a R/W memory cycle or a programmable Interface command. It is controlled by the Address switch control bits in the CSR. The steering is generated for R/W memory as follows:

Bit 0 This bit equals 0 for R/W mmemory

Bit 1 This bit defines local or remote memory. It is equal to PTW bit 0 if paged or WRP bit 0 if absolute.

Bits 2–4 These bits are the memory steering bits. The initial value is equal to PTW bits 1–3 if paged or WRP bits 1–3 if absolute. This is also the final value if bit 1 defines remote memory. When bit 1 defines local memory, bits 2 and 3 define the local memory port and steer addresses to the ROM in the local memory controller. Bit 2 is equal to the Exclusive OR of the initial value and the Local Memory Port Specifier (LMPS) line from the SIU. Bit 3 is equal to the Exclusive OR of the PCR ROM bit if the initial value is zero.

Bit 5 This bit defines a single or double word memory cycle. It is equal to bit 1 of the CSR ZAC field.

Bit 6 This bit defines a read or write cycle. It is equal to bit 0 of the CSR ZAC field.

The steering is generated for a PI command as follows:

Bit 0 This bit equals 1 for a PI command

Bits 1–4 These bits define the SIU port to which the PI command is directed and equal bits 0–3 of PSR.

Bits 5–6 These bits are the same as for a R/W memory cycle and are generated in the same way. The outputs of the steering switch are clocked into the steering register at the SIU interface each time a memory cycle or PI command is initiated.

Result-XBAR

The result Crossbar (R-XBAR) 38 provides simultaneous transfer of its inputs to both the Data Out and Working registers. A third output is wired to a display panel and provides the path to display most of the IOPP registers. The output to the working register is controlled by the WR Write Address bits in the CSR and can select any of the four inputs. The output to the DO register 12 is controlled by the DO Write Address bit in the CSR and can select either the ALU/Shifter Output switch or the Address switch. However, this position is forced to select the PSR/PCR input if the DPCR line from the SIU is activated.

0) ALU/Shifter Output switch
1) Address Switch
2) PSR/PCR Switch
3) SPB Input Switch

Working Registers

The four working registers are contained in the dual readout register bank 26. Register 0 contains the current Instruction Counter (IC). (The IC is also maintained in the current level's GR1 of the GR scratchpad). Registers 1, 2, and 3 are working registers for instruction execution. They are labeled R1, R2, and R3.

The two Working register outputs are labeled WRP and WRR. WRP is used to access PTW's from the PTW scratchpad, R/W memory address generation and supplies the Working register input to both the GR scratchpad and the SPB register. The register enabled out of WRP is controlled by the WRP bits in the CSR. WRR is used to provide operands to the A and B operand switches and the input to both the PSR and PCR registers. The register enabled out of WRR is controlled by the WRR bits in the CSR.

The Working registers can be loaded from any of the XBAR inputs. The register to be loaded and the write clock is controlled by the WR write address and Write WR bits in the CSR.

There is no restriction on the registers selected for the read and write operations. It can be three different registers or they can all be the same one.

PSR/PCR—Process State Register/Process Control Register

The Process State register (PSR) 42 is kept outside the GR scratchpad since it is continuously monitored and updated. It is loaded from the WRR output of the Working registers. A write clock is generated for the PSR each time a master mode program loads GRO (GRO written using the WA address) or the PSR/PCR control bits in the CSR define a write PSR operation.

The entire PSR is loaded during a master mode load of GRO, execution of an Exception from the ECB, or the execution of a DISP, MME, RMM, or REL instruction. When an interrupt is executed, the steering from the Interrupt data word is inserted into the PSR data from the ICB prior to loading.

The condition code (cc), carry (c), and process timer are continuously updated. The cc is loaded each time an instruction is executed requiring a cc update. C is loaded with the carry out of the ALU each time the cc is loaded and the ALU is in the arithmetic mode. The process timer is decremented each time the Timer Ticker rolls over. The Timer Ticker is an eight bit counter which counts on all system clocks (controlled clocks in step mode). The Timer Ticker is also used to detect an operation not complete or lock up exception as described in the section on exceptions.

The Process Control register (PCR) is common to all levels. It is loaded from the WRR output of the working registers (not all bits are loadable). A write clock is generated for the loadable bits when the PSR/PCR control bits in the CSR define a write PCR operation.

Bits 18–19 and 28–34 are loadable. Bits 0–16 set when the defined condition occurs and are reset by the set/reset bit control in the CSR. Bits 23–26 are provided for software to read.

The PSR/PCR switch into the R-XBAR selects the corresponding register to be loaded into one of the working registers. This switch is controlled by the PSR/PCR control bits in the CSR but is forced to select PCR if the DPCR line from the SIU is activated.

The dual readout register bank 14 provides four words of buffering for intructions. The current instruction read output (CIR) and next instruction read output (NIR) provide access to the entire instruction independent of the instruction length and address. This is provided through the Instruction register switch (IRSW) 80. The CIR address is equal to the current Instruction Counter (IC) bits 32 and 33 which points to one of the four words. The NIR address is generated to point to the following word. IRSW is controlled by the current bit 34 of the IC which defines whether the instruction starts on a word or half word address. The two IRSW positions are therefore 0) CIR 0–35 and 1) CIR 18–35, NIR 0–17. IRSW 0–17 will reflect a half word instruction and IRSW 0–35 will reflect a full word instruction. The CIR and NIR addresses are updated each time the working register IC is updated. All fields of the Instruction word must therefore be used or saved (WA) prior to updating the IC.

The IR is loaded each time a new value is loaded into the IC due to an interrupt, exception, branch, etc. or each time CIR address crosses over a two word boundary when the IC is updated by the current instruction length. The instruction access control is described below for the two conditions (1) enter new procedure and (2) incrementing through current procedure. In both cases the instruction fetches are double precision memory cycles and the addresses are paged unless the PSR defines absolute mode.

1) The double word instruction fetch is initiated and the IR write address loaded on the clock that pages (if required) the new value of IC. The IR write address is loaded with 00 if IC 32=0 or 10 if IC 32=1. (The CIR and NIR addresses are loaded when the new IC value is loaded.) When the first word is available from memory, it is written into IR and the least significant bit of the write address is set. This causes the next memory word to be written into the second word of the pair (01 or 11). The IC value plus eight (bytes) is then used to initiate another double precision memory read using the paged (if required) address. The IR write address is updated to the next two words (10 if IC 32=0 or 00 if IC 32=1 and a test is made to see if instruction execution can begin or if execution must wait for the memory cycle to complete. The test is on bit 33 of the IC. If the test indicates the new procedure is being entered at the last half word of a two word pair (33, 34=1, 1), the instruction execution must be delayed until the data is available from the second double precision cycle to guarantee IR contains a full instruction word.

2) The execution of each instruction includes an update of the IC by that instruction's length. If this update causes the IC to pass over a two word boundary (old IC 32 ≠ new IC 32), the two word area of the IR that was just finished (old IC 32 value) can be loaded with new instructions. The new IC value plus eight (bytes) is then used to initiate a double precision memory read using the paged (if required) address. The IR address is updated to point to the IR area available. When the two words are received, they are written into the two word area as described above.

Control Store Addressing and Sequencing

The Control Store Address is stored in the CSA switch 16. The first four positions of the CSA switch are controlled by the CSA switch control field in the CSR. The CSA switch control can select the Next Address Register (NA) 82, the Return Address Register (RA) 84, the Execution Address Register (XA) 86, or the output of the Standard Sequence decode network (SS) 88. In an alternative embodiment the SS Decode network 88 may be combined with Pathfinder 92 to provide both standard sequence and execution addresses in control store 18, as more particularly shown in copending application Ser. No. 5,202,534. The Exception position is forced when either of these two conditions exist. The Exception address is reflected unless an Interrupt is being executed. The two PTW miss positions are forced when a PTW miss is detected. The constant position is selected when the Branch control field in the CSR calls for a branch to the constant address.

NA is loaded on each execution clock by the sum of the CSA switch 16 output plus one plus a conditional skip constant 90. If no skip is called for by the CSR skip control field, NA is loaded with the address of the microinstruction immediately following the one being accessed (i.e., the clock that loads the microinstruction at address M into the CSR loads the address M+1 into NA). If a number of microinstructions are to be conditionally skipped, the CSR skip field can specify that a skip be executed with the SCR constant field defining the condition to be tested and the number (1 through 7) of microinstructions to be skipped. The sequence for a skip is as follows: microinstruction at M calls for a conditional skip, the execution of this microinstruction loads M+1 into the CSR and load the address of M+1+1+SKP into NA. SKP=0 if the skip is not satisfied and equals the skip count defined in the least significant three bits of the CSR constant field if satisfied. The skip is inhibited if any of the last four positions are selected in the CSA switch.

The conditions that can be tested for skip execution are defined by bits 3–5 of the CSR constant field. WRR 35, WRR 0, WRR 33 and the carry bit in PSR need to be tested for zero or one. The PSR cc field will be tested for zero, one, two, or three. Bits 1–2 of the constant field are used to define the test. The conditions to be tested are as follows:

0) WRR 35=K2 if K1=1

WRR 0=K2 if K1=0
1) Carry bit in PSR=K2
2) WRR 33–34=K1 –2
3) Address syllable (AS) with IRSW 18=0
4) PSR cc field has corresponding bit in IRSW CF field
5) PSR cc field=K1–2
6) IRSW 7=WRRO if K1=0
   IRSW 7=K2 if K1=1
7) Higher Level Interrupt or Level Zero Present line from SIU if K2=0. Level Zero Interrupt Present line from SIU if K2=1. The RA register 84 is loaded from the NA register 82 whenever the Load RA bit is on in the CSR.

The XA register 86 is loaded from the Pathfinder 92 output each time the SS position is selected in the CSA switch. The use of the Pathfinder will be described below. Its output is two control bits and two eight bit addresses. The address is used to address the upper 256 words of Control Store (address bit zero is forced to 1 in the XA position of the CSA switch).

The execution of a software instruction is in two phases. The first phase is a microinstruction sequence common to a group of instructions. The second phase is a microinstruction sequence (which is only one microinstruction in most cases) unique to the specific software instruction being executed. After completing the second phase, the common phase of the next instruction would be entered (in some cases, the second phase may return to the first phase via RA register 84 for a few additional common steps prior to entering the next instructions common phase).

The operation code of IRSW 80 provides the Pathfinder address and an input to the Standard Sequence Decode network 88. The Standard Sequence Decode network generates the Control Store address of the start of the microinstruction sequence common to the group of instructions containing this one. (This sequence is referred to as a standard sequence.) The location in the Pathfinder addressed by the operation code contains the address in Control Store where the unique sequence for this instruction starts. The instruction is then executed by branching to the Standard Sequence address, executing the common steps, branching to the unique sequence address in XA register 86, executing the unique steps, updating the Instruction Count (IC) so that the next instructions operation code is enabled out of IRSW and repeating the above sequence by branching to the new Standard Sequence.

The interrupt answering, exception processing, and PTW missing sequences are entered by forcing the corresponding position to be selected in the CSA switch 16. Interrupts are executed at the completion of software instructions. If Higher Level Higher Interrupt Present (not inhibited) or the Level Zero Present lines from the SIU are active when the SS position of the CSA switch is selected by the CSA switch control bits in the CSR, the CSA switch control logic is forced to select the Exception/Interrupt position. This causes the interrupt answering sequence to be entered rather than the next instructions standard sequence. (The Exception/Interrupt position reflects the address of the interrupt answering sequence at this time.)

Missing Page Table Words (PTW) cause immediate entry into the PTW missing sequences. Either the operand or instruction missing position is forced by the CSA switch 16 control logic during the clock period immediately following the paging step. The return from either sequence is to the standard sequence decoded from IRSW. This causes the instruction that was being executed to be started over again. Therefore, the microprogram will not do anything prior to the PTW missing detection that can't be done again. A flip/flop is set when the PTW miss is detected that stays set until the address is once again paged. A miss the second time through causes an exception as defined below.

The exceptions fall into two categories. The first type causes an immediate entry into the exception processing sequence. The second type does not affect the CSA switch 16 control logic until the next instructions standard sequence is entered. Both types cause the Exception/Interrupt position in the CSA switch 16 to be selected and set the corresponding bit in the PCR register 44.

The first category of exceptions are operation not complete, Page faults, Page not resident, and illegal instructions. They all must be serviced as soon as they are detected since continuation of instruction execution is impossible. The second category is process timer run out, overflow, lockup fault, and address misalignment. Divide check is handled by a test and branch if divisor is zero. They all indicate faults but do not need to be immediately serviced and can wait until the start of the next instruction.

Control Store Output Register

The Control Store Output register (CSR) 19 contains the microinstruction being executed. Provision is made for a remote CSR register, as indicated.

There is a one of four position switch 94 supplying the input to CSR. The four positions on the CSR input switch are as follows:

0)1) These positions are the inputs from the ROM chips on the Control Store substrates, first 256 locations and second 256 locations respectively.

2) This position is the input from the maintenance panel.

3) This position reflects the local CSR. It is used to reload the remote CSR bits when the maintenance panel switches are used to display data.

Data is displayed in the I/O system by simulating CSR with maintenance panel switches. When the switches are enabled out of the CSR input switch 94, a signal is generated causing the remote CSR bits to be loaded with the microinstruction simulated by the switches. The old contents must be reloaded when the display of the registers is completed. This is accomplished by selecting postion 3 for one clock prior to switching back to position 0 and reloading the remote CSR bits during the one clock period. A block diagram of the input to the local and remote CSR is shown in FIG. 3 with the timing diagram for reloading the remote CSR after using the maintenance panel switches for display.

The format of CSR is as follows:

| | |
|---|---|
| 0 | Clock NA into RA |
| 1 | Execute SKIP (K1–2=test, K3–5=condition, K6–8=skip count) |
| 2 | Branch to K0–8 |
| 3–4 | WR write address |
| | 00=write IC (Load WA if Write WR) |
| | 01=write R1 (set W if Write WR and CSA=SS) |
| | 10=write R2 |
| | 11=write R3 |
| 5 | Wait for Accept Read Data from SIU |
| 6–7 | X-BAR address for WRW output |
| | 00=Adder/Shifter Output switch |
| | 01=Address switch |
| | 10=PSR/PCR switch |
| | 11=SP Output switch |

-continued

| | |
|---|---|
| 8–9 | Condition Code (CC) Control |
| | 00=NOP |
| | 01=Load Arithmetic |
| | 10=Load Logic |
| | 11=Load Parity of SPB Least Significant Byte |
| 10 | Write PTW Scratchpad |
| 11–13 | ZAC for R/W memory cycle (bits 1–3 of R/W address switch positions 0 and 1) |
| | 0XX=Read |
| | 1XX=Write |
| | X0X=Single precision |
| | X1X=Double precision |
| 14 | Set/Reset bit defined by CSR41–44 |
| 15–17 | SIU Request Type |
| | 000=NOP |
| | 001=Interrupt Data |
| | 010=Release and Interrupt Data |
| | 011=Memory or Programmable Interface Data (PI if 19–20=10) |
| | 100=Byte Read or Write (Byte address, R/W Zone if write) |
| | * 101=Instruction Fetch |
| | * 110=Instruction Fetch if CIR0=IRW0 |
| | ** 111=Instruction Fetch if SKIP test satisfied or if CSR1=0 |
| 18 | PTW Scratchpad address |
| | 0=Extended Read/Write from WRP |
| | 1=Current level PTW Read/Write from Effective Address |
| 19–20 | Address Switch Control |
| | 00=Paged address (control logic forces 01 if PSR 10=1) |
| | 01=Absolute address |
| | 10=PI address |
| | 11=PTW scratchpad 0–35 |
| 21 | Write WR |
| 22–23 | CSA switch control (first four positions) |
| | 00=Next Address register (NA) |
| | 01=Return Address register (RA) |
| | 10=Execution Address register (XA) |
| | 11=Standard Sequence Address |
| 24–25 | WRR read address |
| 26–27 | WRP read address |
| | 00=IC |
| | 01=R1 |
| | 10=R2 |
| | 11=R3 |
| 28 | A Operand Switch |
| | 0=SPB |
| | 1+WRR |
| 29–30 | PSR/PCR control & ALU Mode |
| | 00=Read PSR or Logical Mode |
| | 01=Read PCR or Arithmetic Mode |
| | 10=Write PSR |
| | 11=Write PCR |
| 31–32 | Adder/Shifter Output switch |
| | 00=Shifter |
| | 01=ALU |
| | 10=Store 32 |
| | 11=Load 32 |
| 33–35 | B Operand switch |
| | 000=DL |
| | 001=DS |
| | 010=IS |
| | 011=IL |
| | 100=WRR |
| | 101=8, Word length, or Carry |
| | 110=Constant K0–8 |
| | 111=DI |
| 36–44 | Constant K0–8 |
| | This field is also used for mutually exclusive control |
| | 36–37=8/WL/CY control |
| |   00, 8/WL/CY=IRSW Instruction word length |
| |   01, 8/WL/CY=PSR Carry bit |
| |   10, 8/Wl/CR=8 |
| | 36–38=Shift Count Switch control |
| |   000 Left shift |
| |   001 Right shift |
| |   010 CSR Shift Count (39–44) |
| |   011 Instruction F1 field |
| |   100 Instruction F2 field |
| |   101 Instruction F3 field |
| |   110 Byte load |
| |   111 Byte Store |
| | 39–44=CSR Shift Count |
| | 36–44=CSA switch branch address |
| | 37–38=SKIP test value for conditions tested for multiple values |
| | 38 =WA input switch Control (0=GR1 1=GR2) |
| | 39–41=SKIP test condition |
| |   000 WRR35=CSR38 if CSR 37=1 |
| |       WRR0=CSR38 if CSR 37=0 |
| |   001 PSR 13 (carry) = CSR38 |

-continued

| | |
|---|---|
| |   010 WRR33=CSR38 |
| |   011 IRSW 14–35 contains Address syllable and bit 18–0 |
| |   100 BRAC CF field has bit corresponding to PSR CC if CSR 38=1 |
| |     BRAC CR field does not have bit corresponding to PSR CC if CSR38=0 |
| |   101 PSR CC field=CSR37–38 |
| |   110 IRSW7=WRR0 if CSR37=0 |
| |     IRSW7=CSR38 if CSR37=1 |
| |   111 SIU HLIP line active and not inhibited or LZP active |
| 42–44 | =SKIP count |
| 38–44 | =GR scratchpad total address |
| 41–44 | =GR scratchpad address per level |
| 41–44 | =Set/Reset bit address |
| | 0000 Reset Halt Mode |
| | 0001 Set Halt mode |
| | 0010 Reset Inhibit Interrupt mode |
| | 0011 Set Inhibit Interrupt mode |
| | 0100/0101 Reset PCR Exception Storage |
| | 0110/0111 Not Defined |
| | 1000/1001 Invert DO, Steering, and interrupt Data Parity |
| | 1010/1011 Invert GR Parity and inhibit GR SP write clock conditionally |
| | 1100/1101 Inhibit GR SP write Clock conditionally |
| | 1110/1111 Set Measure F/F |
| 45–48 | ALU Control/Shift Input switches Control |
| | 45–48=ALU operation (CSR30=mode) |
| | 45–46=Left Shift Input switch |
| |   00 A Operand switch |
| |   01 Sign of Right Shift Input Switch |
| |   10 Zeros |
| |   11 Ones |
| | 47–48=Right Shift Input switch |
| |   0X Zeros |
| |   10 B Operand switch |
| |   11 A Operand switch |
| 49–50 | GR Scratchpad Control |
| | 00=NOP |
| | 01=Write GR scratchpad |
| | 10=Load SPB from GR scratchpad |
| | 11=Load SPB from WRP |
| 51–53 | GR Scratchpad Address |
| | 000=CSR scratchpad total address (CSR38–44) |
| | 001=CSR scratchpad address per level (AIL, CSR41–44) |
| | 010=Extended Read/Write address from WRR |
| | 011=Current level XR2 |
| | 100=Current Level XR1 |
| | 101=Current level GR1 |
| | 110=Odd register of pair addressed by WA in current level |
| | 111=WA address in current level |

\* These codes cause an instruction PTW missing sequence if a page fault is detected.

\*\* This code causes an operand PTW missing sequence if a page fault is detected.

DATA FORMATS

Format of Information in Storage — An address defines the location of a nine-bit byte, which is the basic element of information in storage. Consecutive bytes are defined by consecutive increasing addresses. A word is a group of four consecutive bytes. The location of a group of bytes is defined by the address of the leftmost byte. A group of bytes is halfword, word, doubleword, or quad-word aligned if its address is in integral multiple of two, four, eight, or sixteen, respectively. Instructions in storage must be halfword aligned. Word-length operands must be word-aligned, and doubleword operands must be doubleword aligned.

Numeric Data — Numeric data has only one form — fullword integers. The radix point is assumed to be to the right of the least significant bit. Negative numbers are represented in two's complement form. The storage location is defined by the address of the leftmost byte, and it must be word aligned.

32-Bit Operations — Interfaces that connect the IOP to machines with a 32-bit word length should pack the 32-bit data as shown, eight bits right-justified within each nine-bit byte:

```
0        9        18       27       35
| 0    | 0      | 0      | 0      |     |
 0    7 8    15 16    23 24    31
```

This packing permits bytes to be addressed using the normal IOP byte addressing. Special instructions (LD32, ST32) are provided to convert 32-bit numeric data from this form to a 36-bit, right-justified sign-extended form, and back.

REGISTER FORMATS

General — Visible registers are those processor registers which can be accessed with processor software instructions. The following constitute the visible registers of the IOP/P:

| | | |
|---|---|---|
| a. | Process State Register | (PSR) |
| b. | Instruction Counter | (IC) |
| c. | Page Table Base Register | (PTBR) |
| d. | General Registers | (GR's) |
| e. | Control Block Base Register | (CBBR) |
| f. | Process Control Register | (PCR) |

The PSR, IC, PTBR and GRs are held in scratchpad 26 of sixteen 36-bit registers and are assigned as shown:

Mode.

CC[11:2] — Condition Code. Meaning of the condition code is given for each IOP/P instruction. In general, correspondence is:

| | |
|---|---|
| Result = 0 | CC ← 0 |
| Result < 0 | 1 |
| Result > 0 | 2 |
| Overflow | 3 |

C[13:1] — Carry bit out of adder. Carry (1) or No Carry (0) resulting from execution of instructions using arithmetic functions of the adder. (Adds, subtracts, multiply, divide, compare and negate.)

Process Timer [14:22] — A timer which is decremented periodically while this process is active. A process timer runout exception occurs when the timer value reaches zero. It is presently planned to decrement the timer once every 512 processor cycles. For a cycle time of 80 nonoseconds, this results in a minimum value of about 40 microseconds, and a maximum value of 2.67 minutes.

Due to the frequency of access to the PSR, either for modification or reference, the actual value for the current process is held in a special register outside the general register scratchpad. For performance reasons, changes in the register are not reflected in $GR_0$. This scratchpad location assigned to the PSR is used only to safestore the current PSR value in the event of an interrupt.

Instruction Counter (IC) — The Instruction Counter holds the address of the current instruction. Since in-

```
PSR   | STEERING      |P|R|A|CC|C| PROCESS TIMER        |  0
IC    | L/R |S|           ADDRESS                       |  1
      |                                                 |  2
      |                                                 |  3
      |                                                 |  4
      |                                                 |  5
      |                                                 |  6
      |                                                 |  7
      |                      GRs                        |  8
      |                                                 |  9
      |                                                 | 10
      |                                                 | 11
      |                                                 | 12
      |                                                 | 13
      |                                                 | 14
PTBR  | L/R |S|PROG #| PAGE TABLE BASE       | KEY      | 15
```

Process State Register (PSR) — The Process State Register holds information essential to the control of the current process. It has the following format:

```
        0       7 8 9 10 11 12 13 14                35
PSR   | STEERING     |P|R|A| CC |C| PROCESS TIMER    |
(GR0)

0  1 3 4   8 9                           35
IC        | L/R| S|RFU |        IC                    |
(GR1)
``` structions must be half-word aligned, the least significant bit is always zero. The IC is held in $GR_1$, and it has the following format:

Steering [0:8] — Steering inserted to identify interrupt source.

P [8:1] — Privilege. Master (0) or Slave (1) Mode.

R [9:1] — External Register. Certain non-IOP/P registers cannot be altered if this bit is set.

A[10:1] — Address Mode. Absolute (0) or Paged (1)

L/R [0:1] — Local/Remote, Specifies Local (0) or Remote (1) memory.

S [1:3] — Steering. Specifies which remote memory for remote memory references.

RFU [4:5] — Reserved for Future Use.

IC [9:27] — The (byte) address of the current instruction.

Page Table Base Register (PTBR) — The Page Table Base Register points to the page table used to provide paged address relocation for the current process. It may be loaded only in master mode. The PTBR is held in GR15, and it has the following format:

```
           0    1  3 4     8 9           29 30        35
PTBR      | L/R | S | PROG # | PAGE TABLE BASE | KEY |
(GR15)
```

L/R [0:1] — Local/Remote.
S [1:3] — Steering.
Prog. No. [4:5] — Program Number. A field which may be used by software to carry additional program identification. This field is ignored by the processor hardware.
Page Table Base [9:21] — This is the absolute address of the base of the table of Page Table Words for this process. Since the address is filled to 27 bits by adding six zeros at the right, page table addresses must be congruent to 0 mod 64 (bytes).
Key [30:6] — The key is a process identifier used to associate Page Table Words with processes.
General Registers (GR) — The remaining 13 registers GR$_2$ — GR$_{14}$ are general registers. These may be used as source or destination operands, or as first or second-level address modifiers.

General Registers are used in even-odd pairs by some instructions. These instructions include RDRR, WRRR, L2MG, S2GM, DSL and DSR. For these instructions, GR must be even and the odd register of the pair is the next higher numbered register. For example: if the even GR specified is 4 the odd register is 5.

Control Block Base Register (CBBR) — The Control Block Base (CBB) is an absolute address which points to the base in memory of the Exception Control Block (ECB) and Interrupt Control Block (ICB) tables. These tables are defined below.

The Control Block Base Register is actually held in the scratchpad location assigned to GR$_0$ for the highest priority process level. Two CBB values, a primary and a secondary are held in the register, which has the following format:

This alignment permits the location of bases of the ECB and ICB tables on any 512-word boundary in any memory.

The secondary CBB is invoked for interrupts due to local memory errors. When used, the secondary CBB is aligned as shown:

```
  0   1 3 4    8 9        17 18   24 25        35
| L/R | S | RFU | 000 0000 00 | CBB2 | 0000000 0000 |
```

This alignment permits the location of the bases of the alternate ECB and ICB tables on a 512-word boundary within the first 64K of any memory.

The Exception Control Blocks and Interrupt Control Blocks are stored as shown below with respect to the CBB:

```
              |--------|
              | ECB15  |
              |   .    |
              |   .    |
              |   .    |
              | ECB1   |
       CBB →  | ECB0   |
              | ICB0   |
              | ICB1   |
              |   .    |
              |   .    |
              |   .    |
              | ICB255 |
              |--------|
```

Process Control Register (PCR) — There is one Process Control Register (PCR) common to all levels. It has the following format:

```
     0   1 3 4      10 11  12 14 15   19 20         35
    | L/R | S | CBB2 | L/R | S | RFU |    CBB1     |
         _____/_____/
          Secondary CBB        Primary CBB
```

```
       0         8 9      15 16 17 18 19 20 22 23 26 27 28    35
      |           |Parity  |   | R| T| R|    |PROC | I | INT. |
  PCR | Exceptions| Errors |L$| F| &| O|RFU | # & | N | REQ. |
      |           |        |   | U| D| M|    |LEVEL| H |      |
```

The Primary CBB is used for all exceptions, and for all interrupts except those associated with local memory errors. When used, the primary CBB is aligned as shown:

Exceptions [0:9] — Each bit indicates a non-MMe exception of of particular type.

```
  0   1 3 4    8 9          24 25         35
| L/R | S | RFU |   CBB1      | 000 00000000 |
```

Parity Errors [9:7] — Identifies the point in the processor at wich a parity error was detected.

LZ [16:1] — No responses to level zero interrupt present.

RFU [17:1] — Reserved for future hardware use.

T&D [18:1] — T&D Mode. Halt instruction stops processor. All interrupts are ignored.

ROM [19:1] — ROM bit. Controls access to Read Only Memory.

RFU [20:3] — Reserved for future hardward use.

Proc No. & LEVEL [23:4] — Processor number and Level.

INH [27:1] — Interrupt inhibit bit.

INT. REQ. [28:8] — Interrupt request bits. Each bit set indicates a software set interrupt at a level corresponding to the bit position. Request level 7 (Bit 35) is always set. Processor set interrupts at levels 0–7 use ICB's 8–15 respectively.

EXCEPTIONS

Exceptions are processor-detected conditions which cause automatic entry to an exception processing routine. Exception conditions may be created deliberately, or they may be the result of a programming error or a hardware error outside the processor. Exception conditions are defined as shown below. For non-MME exceptions, correspondence is shown between type and bit positions of the PCR.

| PCR Bit | Exception Type |
|---|---|
| 0 | Operation not complete (ONC). No response on ARA or ARDA from SIU. |
| 1 | Page address bounds fault (Key check). |
| 2 | Page access fault. |
| 3 | Page not resident in memory. |
| 4 | Illegal operation (invalid instruction, illegal slave instruction, or illegal slave operation). |
| 5 | Process timer run out. |
| 6 | Overflow if PSR CC = 11, Divide Check if PSR CC = 00. |
| 7 | Lockup fault (inhibit interrupts for more than 40 μs). |
| 8 | Address misalignment. |

Exception conditions are identified by a four-bit exception number. For master mode entry exceptions, this number is taken from bits [10:4] of the instruction. In all other cases, the exception number is zero. The exception number is used as an Exception Control Block Number (ECB No.) to identify a four-word Exception Control Block (ECB) which points to the exception processing routine. The byte address of an ECB is given by ECB address = Control Block Base — 16 (ECB No. + 1). The format of the ECB is shown below:

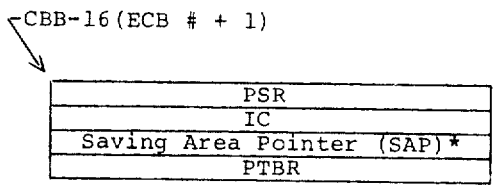

*A Saving Area Pointer (SAP) for processor pair 0 is held in the third word of ECB 0, and a SAP for processor pair 1 is held in the third word of ECB 1. The third word of ECB's 2–15 are not used.

Before an exception processing routine can be entered, essential information about the current process must be safestored. This is performed as a part of the processor response to an exception. Since occurrences of exceptions may be nested (i.e., a second exception may occur before completion of processing for the first), a stack is used to provide space for process safestore. The stack pointer is called the Saving Area Pointer (SAP), and it is held in the third word of ECB 0. Multiprocessor systems require a second stack, and the SAP for the second processor is held in the third word of ECB 1.

When an exception is detected, the appropriate Saving Area Pointer is retrieved, and information about the current process is safestored in the stack in the following order:

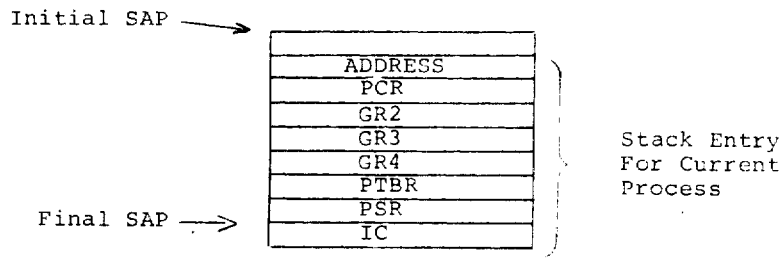

The Saving Area Pointer is updated accordingly.

The IC stored in the stack points to the instruction following the one in process at the time the exception was detected. The address stored in the last stack location is the last address of interest generated before the exception was detected. It is primarily for exceptions involving addresses, including operation not complete, bounds, access and missing page exceptions.

After this information about the current process has been safestored in the stack, the PSR, IC, and PTBR are loaded from the appropriate Exception Control Block, and the address of the Saving Area Pointer used by this processor is loaded into GR$_2$. This completes the entry to the exception processing routine.

Upon completion, the exception processing routine must issue a special instruction (RMM) to return to the process in which the exception was encountered. This instruction loads the PSR, IC, GR2, GR3, GR4, and PCR and the PTBR from the stack, and decrements the Saving Area Pointer. If exceptions and RMM instructions do not occur in pairs, the exception processing software must ensure that the stack is properly maintained. There are no checks for errors in software manipulation of the stack pointer, or for stack overflow or underflow.

INTERRUPTS

Interrupts are events detected outside the processor which require a processor response. Interrupts in the IOP may be assigned to one of eight priority levels. Level 0 is the highest priority level, and level 7, the lowest. In order to minimize the time required to answer an interrupt request, the IOP/P provides a complete set of registers for each of the eight levels. When an interrupt causes the initiation of a new process, the current process is left intact in the registers assigned to the current level. Control may be returned to the interrupted process simply by reactivating that process level. The need to safestore and restore interrupted processes is eliminated, along with the accompanying overhead.

The sixteen registers for each level are held in successive 16-register blocks in the 128-word IOP/P scratchpad. Registers for level 0 are held in scratchpad locations 0-15. Since the PSR for level 0 is never transferred to the scratch-pad (level 0 cannot be interrupted), scratchpad location 0 is used to hold the Control Block Base. Communication between registers at different levels is possible only via the master mode copy instructions which address the scratchpad.

The IOP System interface Unit (SIU) constantly monitors both the current process level of the processor and requests for interrupts from I/O system modules. Each interrupt request specifies the number of the processor to be interrupted, the priority (level number) of the request, and steeing to identify the interrupt requestor. This information is held in each module which may request interrupts, and for most modules it can be set using programmable interface commands.

Whenever an interrupt request is present at a level higher than the current processor level, The SIU raises the higher level interrupt present line to the processor. If several interrupt requests are present at the same level, the SIU determines which request is passed on to the processor on the basis of priorities established by port number.

If the current process is not interrupt inhibited, an interrupt request causes the IOP/P to suspend the current process and to accept an interrupt word from the SIU. The interrupt word has the following format:

This process may be one that was previously interrupted, or a new process to be initiated as the result of an interrupt request. At the same priority level, previously interrupted processes have priority over new interrupt requests. Through software loading of the PCR, a processor may present to the SIU an interrupt at any level, 0–7. However, in order to provide a well-defined response to a REL executed at any level, the PCR bit requesting a level-seven interrupt is always set.

If a new process is to be entered as the result of a REL, the processor response is similar to that triggered by a normal interrupt, including acceptance of an interrupt word from the SIU and access to an ICB. If a previously interrupted process is to be re-entered, the SIU supplies only the level number and the fact that an old process is to be re-entered. Since the process state at the time of its interruption is intact in the register scratchpad, this is the only information required to restart the process.

ADDRESS DEVELOPMENT

Addresses generated in the IOP processor may refer to the IOP local memory, to the central system memory, to IOP registers outside the processor (external registers), to registers in the central system (remote registers), or to locations in one of the IOP/P scratchpads. Regardless of the type of storage to be referenced address development starts with the calculation of an effective address.

Effective Address Development — For most IOP/P instructions, calculation of the effective address starts with an Address Syllable (AS). If an instruction includes an Address Syllable, it occupies the field [14:22] and has the following format:

Within the Address Syllable fields are interpreted as follows:

XR₁ [14:4] — This field specifies the general register to be used as the first-level index. A value of 0 indicates

AS:

| XR<sub>1</sub> | 0 | S | | D |
|---|---|---|---|---|
| XR<sub>1</sub> | 1 | XR<sub>2</sub> | S | D |

14   17 18   19      22 23               35

Interrupt Word:

| | 0 1 | | 17 18 19 | | 26 27 28 | | 31 32   35 |
|---|---|---|---|---|---|---|---|
| | N | RFU | | 0 | ICB # | 0 | STEERING |

N [0:1] — New. This bit if set indicates that the interrupt is a new one. If not set, the interrupt word is that of a previously interrupted request that is to resume.

RFU [1:17] — Reserved for future use. This field must be 0 but will not be checked to ascertain that the field is 0.

ICB No. [18:9] — Interrupt Control Block Number.

Steering [27:9] — Steering. This field identifies the interrupt requestor.

Bits 28 to 31 are generated by the SIU and identify the source module (SIU port number) of the interrupt.

To initiate the interrupt processing routine, four registers are loaded from the interrupt control block. When the PSR is loaded, the steering field from the interrupt word is inserted into the steering field of the PSR. The other registers, the IC, GR14, and PTBR, are loaded directly from successive words in the ICB.

The release instruction (REL) is used to exit processes entered as the result of an interrupt. After a REL the SIU selects for execution the highest priority process waiting for the processor.

no first-level indexing.

Index Bit [18:1] — If this bit is 0, no second-level indexing is performed, and the long displacement is used. If the bit is 1, a second level of indexing is performed, and the short displacement is used.

XR₂ [19:4] — If the index bit is set, this field specifies the general register to be used as a second level index.

D [19:17] — If the index bit is not set, D is a 17-bit displacement value which is sign extended to 36 bits.

D [23:13] — If the index bit is set, the 13-bit displacement value D is sign-extended to 36 bits.

Instructions with format BRB also reference storage, but do not include an Address Syllable. In this format, the displacement in the instruction word field [19:17] is implicitly relative to the current value of the instruction counter (IC).

In summary, the effective address is a 36-bit sum, calculated from 36-bit addends in one of the following ways:

Instructions with an Address Syllable:

No index EA = D[19:17] sign-extended
1 Index EA = (XR₁) + D[19:17] sign-extended
2 Indices EA = (XR₁)+(XR₂) + D[23:13] sign-extended Instructions with format BRB
(Implied Index) EA = (IC) + D[19:17] sign-extended Memory Reference Operations — All addresses generated by IOP/P memory reference instructions are byte addresses. Interpretation of the effective address depends on the setting of the address mode bit in the PSR.

Absolute Addresses — In absolute address mode, the effective address is also the absolute address. It is interpreted as follows:

| | 0 | 1 | 3 4 | 8 9 | 35 |
|---|---|---|---|---|---|
| Absolute Address | L/R | S | RFU | | A |

L/R [0:1]— Local/Remote. This bit specifies whether the memory request is to be directed to the IOP (local) memory (0), or a central system (remote) memory (1).

S [1:3] — Steering.

Local Memory References:
For references to local memory, the steering field is interpreted as follows:
Bit 1 — Local Memory Port
   Selection of the local memory port to be used by an IOP processor pair is normally controlled by a bit in an SIU configuration register. However, the other local memory port will be selected if Bit 1 (the leftmost steering bit) is set.
Bit 2 — ROM
   Steering of local memory requests to the ROM is controlled by the "Exclusive OR" of
   Bit 2 and the ROM bit (Bit 19) from the PCR.
   A result of 1 directs a memory request to the ROM.
   A result of 0 implies a normal local memory request.
Bit 3 — Reserved for Future Use
   Bit 3 is not presently used for local memory references.

Remote Memory References:
For references to remote memory, the steering field is interpreted as follows:
Bit 1 — REMA Select
   Selection of one of two Remote Memory Adapters is controlled by Bit 1.
Bits 2–3 — REMA Port Select
   The Remote Memory Adapter port is selected by Bits 2–3.

RFU [4:8] — Reserved for Future Use. This field is presently ignored by the hardware.

A [9:27] — Address. A 27-bit byte address specifying the location of a byte in the memory identified by the Local/Remote and Steering bits.

Paged Addresses — In paged mode, an address translation is applied to the effective address to produce an absolute address. The effective address is interpreted as follows:

| 0 | 17 | 18 | 24 | 25 | 35 |
|---|---|---|---|---|---|
| RFU | | PN | | PRA | |

RFU [0:18] — Reserved for Future Use. This field is presently ignored by the hardware.

PN [18:7] — Page Number. Up to 128 pages are available to each process. The page number is used to locate a Page Table Word (PTW) in the page table for this process.

PRA [25:11] — Page Relative Address. The PRA specifies a byte address within a 2K byte page (512 words).

Referring to FIG. 4, the absolute address is developed by concatenating the page relative address and the page base address from the page table word (PTW) specified by the page number. The local/remote and steering fields in the absolute address are also supplied from the PTW.

Absolute Address [0:3 ] ← PTW [0:3]
Absolute Address [9:16] ← PTW [9:16]
Absolute Address [25:11] ← Effective Address [25:11] The operation is diagrammed below.

The PTW address is computed by adding the page number to the page table base held in the page table base register (PTBR). A description of the PTBR format is set forth above. The PTW format is shown below:

| 0 | 1 | 3 | 4 | 5 6 | 7 | 8 9 | 24 | 25 26 | 27 29 | 30 | 35 |
|---|---|---|---|---|---|---|---|---|---|---|---|
| L/R | S | | A | | R | RFU | PAGE BASE ADDRESS | RFU | | P N | KEY |

L/R [0:1] — Local/Remote.
S [1:3] — Steering.
A [4:2] — Access. This field specifies the access privileges for this page:

| A | ACCESS PRIVILEGES |
|---|---|
| 00 | Read |
| 01 | Read, Write |
| 10 | Read, Execute |
| 11 | Read, Write, Execute |

R [6:1] — Residence. This bit is set to indicate that this page is present in memory.

RFU [7:2] — Reserved for future use.

Page Base Address [9:16] — This field specifies the absolute address of the first word of the page. Paged addresses are formed by concatenating the 16-bit Page Base Address and the 11-bit Page Relative Address.

RFU [25:2] — Reserved for future use.

PN [27:3] — This field is used to identify PTW's held in scratchpad storage. It must be equal to the three most significant bits of the page number.

KEY [30:6] — The key identifies the process with which this PTW is associated.

In this implementation of paged addressing, a scratchpad in the IOP processor will be used as a pseudoassociative memory to hold up to 16 PTW's for the current process. Access of these registers is described by the following algorithm:

The PTW in the location addressed by the least-significant four bits of the page number is read from the scratchpad, and the key is compared with the key in the PTBR. If the keys do not match, the PTW is not associated with the current process, and the correct PTW must be fetched from memory.

If the keys match, the most significant three bits of the page number are compared with the PN field in the PTW. If the numbers are not equal, the correct PTW is not held in the scratchpad, and it must be fetched from memory. Otherwise the access privileges are checked. If the request is valid, the PTW is used to form the absolute address, and a memory operation is initiated. If not, an exception is generated.

When a new PTW must be fetched from memory, it is read from the address calculated by adding the page number to the page table base address from the PTBR. If the key in the new PTW matches the key in the PTBR, the new PTW is saved in the scratchpad in the location just referenced, and used to complete the absolute address preparation. If the keys do not match, the process has exceeded its address range, and an address exception is generated.

Programmable Interface Operations — The Programmable Interface (PI) is used by the IOP/P to read or write data and control registers in other IOP modules. The address for Read External and Write External instructions is derived from the sign extended immediate value given by the instruction plus the contents of an optional index register ($GR_2$) specified by the instruction. The most significant byte [0:9] of the address is ignored, and the least significant three bytes [9:27] are supplied to the programmable interface. Page relocation is never applied to programmable interface addresses. Interpretation of the address portion of a PI command is left to the addressed device.

INSTRUCTION SUMMARY

General — This section provides information concerning instruction length, storage location of instructions, and instruction formats.

Instruction Length and Storage Locations — IOP processor instructions are either two or four bytes in length. Bytes of an instruction are stored in consecutive storage locations. The storage address of an instruction is specified by the address of the leftmost byte and must be a multiple of two. The entry for each instruction includes a mnemonic code, the instruction name, and the format. All instructions with three-letter mnemonics are halfword instructions, and all full-word instructions have four-letter mnemonics.

General Register—General Register Instructions — Thirteen instructions perform arithmetic or logical operations on operands from the bank of general registers. These instructions have this format:

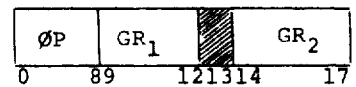

$\phi P$ — Operation Code $GR_1$ — A four-bit field which specifies one of the GR's as operand one. This register is used to hold the result of those operations which require a result register.

$GR_2$ — A four-bit field which specifies one of the GR's as operand two. The contents of this register are not changed except where explicitly stated.

| MNEMONIC | INSTRUCTION |
|----------|-------------|
| CRR | Copy - Register to Register |
| ADR | Add - Register to Register |
| SBR | Subtract - Register to Register |
| MPR | Multiply - Register to Register |
| DVR | Divide - Register to Register |
| CMR | Compare - Register to Register |
| ANR | AND - Register to Register |
| ØRR | ØR - Register to Register |
| XØR | Exclusive ØR - Register to Register |
| CAR | Comparative AND-Register to Register |
| TPR | Test Parity of Register |
| ACR | Add Carry to Register |
| NGR | Negate Register |

General Register — Scratchpad Register Instructions — Four instructions cause the transfer of information between processor scratchpads and general registers. These instructions have this format:

OP — Operation Code

GR — A four-bit field which specifies one of the GR's.

AS — Address syllable used to calculate the effective address Y. The least significant seven bits of Y specify the scratchpad register. Other bits in the effective address are ignored.

| MNEMONIC | INSTRUCTION |
|----------|-------------|
| CRSG | Copy Register Scratchpad to GR |
| CPSG | Copy PTW Scratchpad to GR |
| CGRS | Copy GR to Register Scratchpad |
| CGPS | Copy GR to PTW Scratchpad |

General Register — Non-Processor Register Instructions — Four instructions cause the transfer of information between general registers and non-processor registers. These instructions have the following format:

GRGI 

GRX 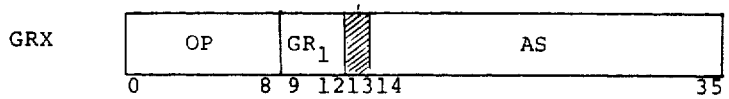

OP — Operation Code
GR₁ — A four-bit field which specifies one of the GR's.
GR₂ — An optional index register. GR₂ = 0 implies no index.
I — An 18-bit immediate displacement which is sign extended with the sign bit S to word length. After performing the optional indexing the resulting address is interpreted as the address of a register outside the IOP/P.
AS — Address syllable used to calculate an effective address Y. This address is interpreted as the address of a register outside the IOP/P.

| MNEMONIC | INSTRUCTION |
|---|---|
| RDEX | Read External Register into GR |
| WREX | Write External Register from GR |
| RDRR | Read Remote Registers into GR |
| WRRR | Write Remote Registers from GR |

General Register — Special Register Instructions — Four instructions perform logical operations on the Process State Register and the Process Control Register. These instructions have the following format:

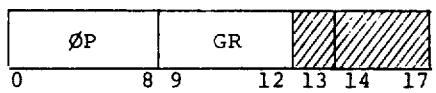

ØP — Operation Code
GR — A four-bit field which specifies one of the GR's.

| MNEMONIC | INSTRUCTION |
|---|---|
| CPC | Copy PCR to GR |
| APC | AND GR to PCR |
| ØPC | ØR GR to PCR |
| CPS | Copy PSR to GR |

Register-Memory Loads — Eight instruction load general registers from memory. These instructions have this format:

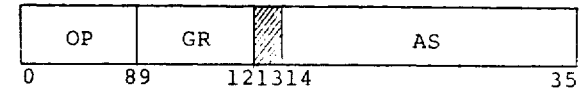

OP — Operation Code
GR — A four-bit field which specifies a GR to be loaded.
AS — Address syllable used to calculate the absolute address X.

| MNEMONIC | INSTRUCTION |
|---|---|
| LDMG | Load Memory to GR |
| LDBG | Load Byte to GR |
| LCMG | Load and Clear Memory to GR |
| L2MG | Load 2 Words Memory to GR |
| LAMG | Load Absolute Memory to GR |
| LD32 | Load from 32 Bit Format |
| LCAG | Load and Clear Absolute to GR |
| L2AG | Load 2 Words Absolute to GR |

| MNEMONIC | INSTRUCTION |
|---|---|
| ADMG | Add Memory to GR |
| SBMG | Subtract Memory from GR |
| CMGM | Compare GR with Memory |
| CMBM | Compare Byte with Memory |
| ANMG | AND Memory to GR |
| ANGM | AND GR to Memory |
| ØRMG | ØR Memory to GR |
| ØRGM | ØR GR to memory |
| XØMG | Exclusive ØR Memory to GR |
| XØGM | Exclusive ØR GR to memory |
| CAGM | Comparative AND GR with Memory |
| ALMG | Add Logical Memory to GR |
| SLMG | Subtract Logical Memory to GR |

Register-Memory Stores — Six instruction store general registers to memory. These instructions have the following format:

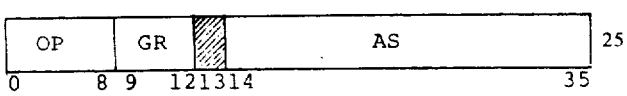

OP — Operation Code
GR — A four-bit field which specifies one of the general registers.
AS — Address syllable used to calculate the absolute address X.

| MNEMONIC | INSTRUCTION |
|---|---|
| STGM | Store GR to Memory |
| STGB | Store GR to Byte |
| S2GM | Store 2 GR's to Memory |
| SAGM | Store Absolute GR to Memory |
| ST32 | Store in 32-bit format |
| S2AM | Store 2 GR's Absolute to Memory |

Register-Memory Arithmetic and Logical Operations — Thirteen instructions perform arithmetic and logical operations on general registers and memory operands. These instructions have the following format:

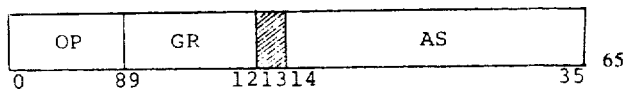

OP — Operation Code
GR — A four-bit field which specifies one of the GR's.
AS — Address syllable used to calculate the absolute address X.

IMMEDIATE OPERAND INSTRUCTIONS

Short Immediate Instructions with General Registers — Three instructions perform operations on a general register and a short immediate operand. These instructions have the following format:

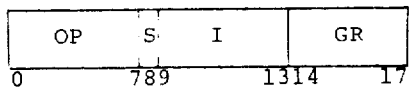

OP — Operation Code
I — A six-bit signed immediate value which is sign extended to word length.
GR — A four-bit field which specifies one of the GR's. This register is used to hold the result of the operation.

| MNEMONIC | INSTRUCTION |
|---|---|
| LSI | Load Short Immediate into GR |
| ASI | Add Short Immediate to GR |
| ALI | Add Logical Immediate to GR |

Short Immediate Instructions with Memory — Two instructions perform operations on a short immediate operand and an operand from memory. These instructions have the following format:

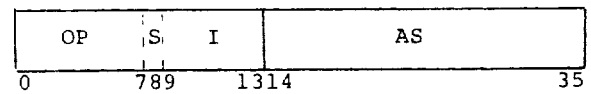

OP — Operation Code
I — A six-bit signed immediate value which is sign extended to word length before being used.
AS — Address Syllable used to calculate the effective address X.

| MNEMONIC | INSTRUCTION |
|---|---|
| SMSI | Store to Memory from Short Immediate |
| AMSI | Add to Memory from Short Immediate |

Arithmetic Instruction with Long Immediates — Two instructions perform arithmetic operations on a general register and a long immediate. These instructions have the following format:

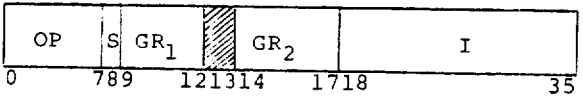

OP — Operation Code
S — Sign bit for immediate operand.
GR₁ — A four-bit field which specifies the general register to receive the result.
GR₂ — A four-bit field which specifies the general register used as an operand.
I — An 18-bit immediate operand which is sign extended with the sign bit S to word length.

| MNEMONIC | INSTRUCTION |
|---|---|
| LDLI | Load Lower Immediate to GR |
| ADLI | Add Lower Immediate to GR | classified as lower immediates and upper immediates. The terms "lower" and "upper" refer to the half of the operand word specified by the immediate. The other half of the operand word is filled with a fill bit. These instructions have the following format:

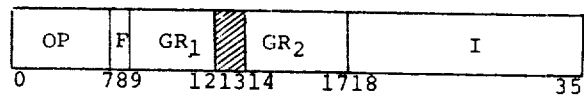

Op — Operation Code
F — Fill bit
GR₁ — A four-bit field which specifies the general register to receive the result.
GR₂ — A four-bit field which specifies the general register used as an operand.
I — An 18-bit immediate operand which is filled to word length by the fill bit F. Lower immediates are filled on the left and upper immediates are filled on the right.

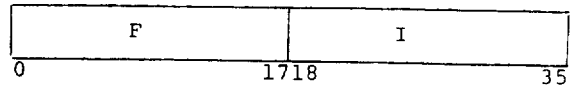

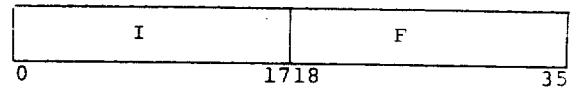

| MNEMONIC | INSTRUCTION |
|---|---|
| CMLI | Compare GR with Lower Immediate |
| ANLI | AND GR with Lower Immediate |
| ANUI | AND GR with Upper Immediate |
| ØRLI | ØR GR with Lower Immediate |
| ØRUI | ØR GR with Upper Immediate |
| XØLI | Exclusive ØR GR with Lower Immediate |
| XØUI | Exclusive ØR GR with Upper Immediate |
| CALI | Comparative AND GR with Lower Immediate |
| CAUI | Comparative AND GR with Upper Immediate |

Logical Instructions with Long Immediate — Nine instructions perform logical operations on a general register and a halfword immediate. The immediates are Instruction with Byte Immediate — One instruction involves a general register and a byte immediate. It has the following format:

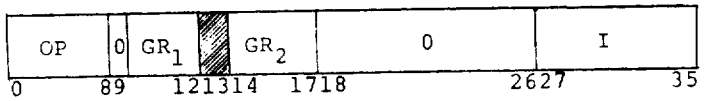

OP — Operation Code
GR₁ — A four-bit field which specifies the GR containing operand one.
GR₂ — A four-bit field which is ignored.
I — The 9-bit byte immediate

| MNEMONIC | INSTRUCTION |
|---|---|
| CMBI | Compare GR with Byte Immediate |

SHIFT INSTRUCTIONS

Six instructions perform shift operations on the general registers. In all of these, the shift count J may be specified either in a register or as an immediate value. If J is contained in a register, the format is:

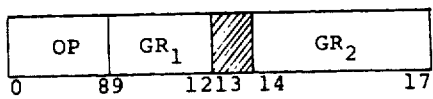

If J is an immediate value, the format is:

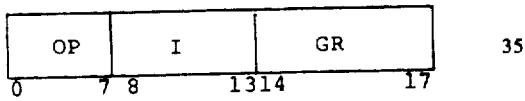

OP — Operation Code
GR₂/GR — A four-bit field which specifies the general register to be shifted.
GR₁ — A four-bit field which specifies the GR containing the 6-bit shift count J. The leftmost 30 bits of GR₁ are ignored.
I — The 6-bit field which specifies the shift count J.

BIT FIELD INSTRUCTIONS

Bit Field Extraction Instructions — Two instructions are used to extract bit fields from one GR and load the field into another GR. These instructions have the following format:

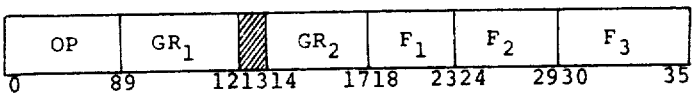

OP — Operation Code
GR₁ — A four-bit field which specifies the destination register.
GR₂ — A four-bit field which specifies the source register.
F₁, F₂, & F₃ — Three 6-bit fields which define the source and destination bit fields. (No hardware check is made for consistency of the three fields.)

| MNEMONIC | INSTRUCTION |
|---|---|
| EBFZ | Extract Bit Field, Zero Fill |
| EBFS | Extract Bit Field, Sign Extend |

Exact and Compare with Register Instructions — Two instructions are used to extract a bit field from one GR and compare it with another GR. These instructions have the following format:

| MNEMONIC | | INSTRUCTION |
|---|---|---|
| GRI | GRGR | |
| LSL | LRL | Logical Shift Left |
| LSR | LRR | Logical Shift Right |
| ASR | ARR | Arithmetic Shift Right |
| RSR | RRR | Rotational Shift Right |
| DSL | DRL | Double Shift Left |
| DSR | DRR | Double Shift Right |

OP — Operation Code
GR₁ — A four-bit field which specifies the GR to be compared.
GR₂ — A four-bit field which specifies the GR from which the bit field is extracted.
F₁, F₂, & F₃ — Three 6-bit fields which define the bit field. (No hardware check is made for consistency of the three fields.)

| MNEMONIC | INSTRUCTION |
|---|---|
| ECRZ | Extract and Compare with Register, Zero Fill |
| ECRS | Extract and Compare with Register, Sign-Extend |

Extract and Compare with Literal Instruction — One instruction performs this function. It has the following format:

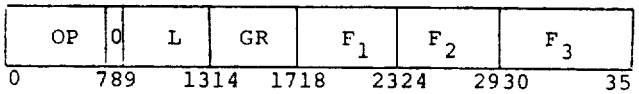

OP — Operation Code
L — A five-bit unsigned literal.
GR — A four-bit field specifying the GR from which the bit field is extracted.
F₁, F₂, & F₃ — Three 6-bit fields which define the bit field. (No hardware check is made for consistency of the three fields.)

| MNEMONIC | INSTRUCTION |
|---|---|
| ECLZ | Extract and Compare with Literal, Zero Fill |

Insert from Register Instruction — One instruction performs this function. It has the following format:

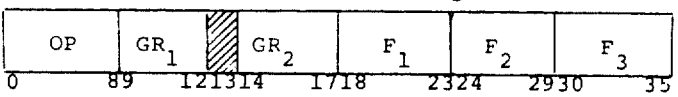

OP — Operation Code
GR₁ — A four-bit field which specifies the GR that contains the bit field to be inserted.
GR₂ — A four-bit field which specifies the GR into which the bit field is inserted.
F₁, F₂, & F₃ — Three 6-bit fields which define the bit field. (No hardware check is made for consistency or logic of the three fields.)

| MNEMONIC | INSTRUCTION |
|---|---|
| IBFR | Insert into Bit Field from Register |

Insert from Literal Instruction — One instruction performs this function. It has the following format:

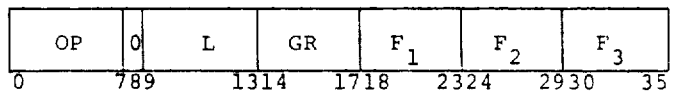

OP — Operation Code
L — A five-bit unsigned literal.
GR — A four-bit field which specifies the register into which the bit field is inserted.
F₁, F₂, & F₃ — Three 6-bit fields, which define the bit field. (No hardware check is made for consistency or logic of the three fields.)

| MNEMONIC | INSTRUCTION |
|---|---|
| IBFL | Insert into Bit Field from Literal |

Conditional Bit Instructions — Two instructions set or reset a bit of a register depending upon the condition code. These instructions have the following format:

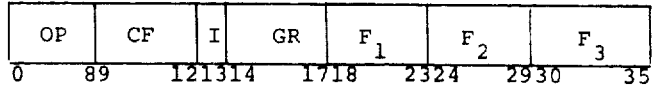

OP — Operation Code
CF — Condition Field. A four-bit field defining the conditions. Each bit of the CF corresponds to a value of the condition code in the following manner:

| CF Bit | Condition Code Value |
|---|---|
| 0 | CC = 0 |
| 1 | CC = 1 |
| 2 | CC = 2 |
| 3 | CC = 3 |

I — 1 for CDSB, 0 for CDRB.
GR — A four-bit field which specifies the GR containing the bit to be set or reset.
F₁, F₂, & F₃ — Three 6-bit fields which define the bit field. (No hardware check is made for consistency or logic of the three fields).

| MNEMONIC | INSTRUCTION |
|---|---|
| CDSB | Conditional Set Bit |
| CDRB | Conditional Reset Bit |

BRANCH INSTRUCTIONS

Branch Instruction Conditional upon Condition Code — One instruction falls in this category. It has the following format:

| OP | CF | //// | AS |
|---|---|---|---|
| 0 | 8 9 | 12 13 14 | 35 |

OP — Operation Code
CF — Condition Field. A four-bit field defining the branch conditions. Each bit of the CF corresponds to a value of the condition code in the following manner:

| CF Bit | Condition Code Value |
|---|---|
| 0 | CC = 0 |
| 1 | CC = 1 |
| 2 | CC = 2 |
| 3 | CC = 3 |

AS — Address Syllable used to compute the effective branch address = Y.

| MNEMONIC | INSTRUCTION |
|---|---|
| BRAC | Branch on Condition |

Save IC and Branch Instruction — One instruction falls in this category. It has the following format:

| OP | GR | //// | AS |
|---|---|---|---|
| 0 | 8 9 | 12 13 14 | 35 |

OP — Operation Code
GR — A four-bit field which specifies one of the GR's to be used to hold the return address.
AS — Address Syllable used to compute the effective branch address Y.

| MNEMONIC | INSTRUCTION |
|---|---|
| BSIC | Branch and Save IC |

Branch Instructions Conditional Upon Register Bit — Two instructions fall in this category. They have this format:

| OP | B | GR | //// | S | D |
|---|---|---|---|---|---|
| 0 | 7 8 | 13 14 | 17 18 | 19 20 | 35 |

OP — Operation Code
B — The six-bit field which specifies the bit position, from 0 to 35, of the bit to be tested.
GR — A four-bit field which specifies the GR containing the bit to be tested.
D — Displacement — a signed value which is sign extended and added to the instruction counter to get the effective branch address Y.

| MNEMONIC | INSTRUCTION |
|---|---|
| BRBS | Branch if Bit Set |
| BRBR | Branch if Bit Reset |

Timing Diagrams

FIGS. 6–20 are illustrative timing diagrams for routine procedures executed in the I/O processor. All diagrams are illustrated with reference to a scratchpad clock, which may have a period of 200 nanoseconds, and a synchronized register clock. The references are to the registers, switches, control store, and other components illustrated in FIG. 2. In some instances reference to other I/O system components is implied.

Figure 6:
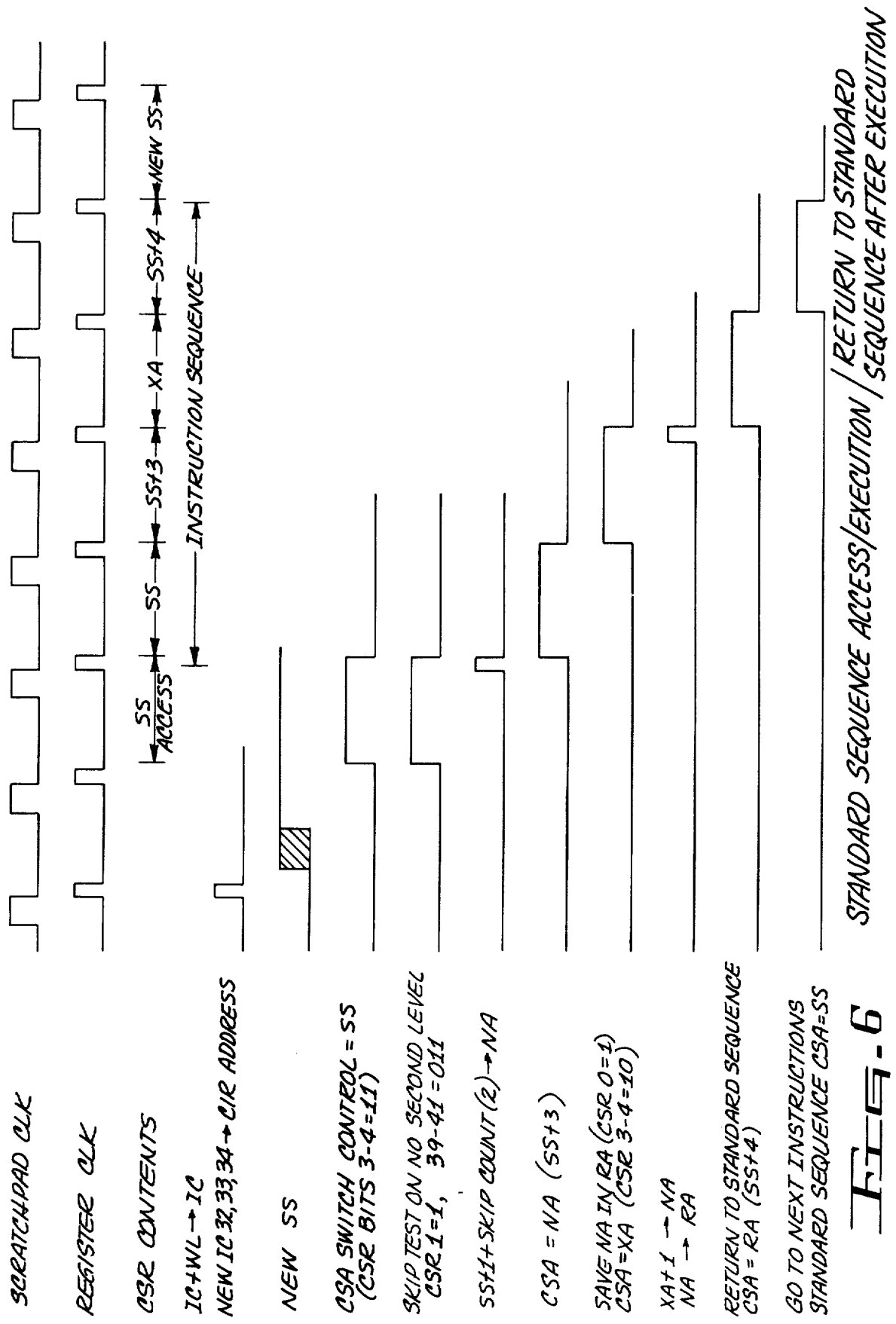

FIG. 6 illustrates the sequence of events in accessing a standard sequence, executing the standard sequence (assuming no second level addressing in the general register), setting the next address (NA) as the standard sequence plus an increment of three, addressing the execution address (XA), and returning to the standard sequence (RA) upon completion of the instruction execution.

FIG. 7 illustrates a skip test execution where the microinstruction for the skip test is at CS location M. FIG. 8 illustrates a Branch to Constant operation where the microinstruction at CS location M executes the operation.

FIGS. 9 and 10 illustrate the writing and reading, respectively, of single or double words to or from the R/W local memory. The active output port request (AOPR) and the active request accepted (ARA) refer to the SIU active port for the local memory.

FIG. 11 illustrates a programmable interface (PI) read/write operation with the WRITE and READ portions both being relative to the SIU request given above the WRITE and READ.

FIG. 12 illustrates a request for interrupt data while FIG. 13 illustrates the request for interrupt data accompanied by a processor release to the SIU.

FIG. 14 illustrates an instruction register read address update. Working register write (WRW) bit 34 controls the IRSW. After IRSW contents change, the DL/DS inputs to B switch are available.

FIG. 15 illustrates an instruction register write address update and instruction fetch, again with references to the SIU. FIG. 16 illustrates the instruction fetch and subsequent request for data read/write cycle. FIG. 17 illustrates an instruction request in process (IRIP) followed by another instruction read cycle.

FIG. 18 illustrates an unconditional (i.e. space in IR is known available) instruction fetch for a first condition where the address is not paged (PSR bit 10 = 0) and the key, access, and memory residence bits compare positive, and for a second condition where the address is paged (PSR bit 10 =,1) or where the key, access, or memory residence bits are not all positive, thus forcing an interrupt, exception or PTW sequence.

FIG. 19 illustrates the force entry into a PTW miss sequence for either an operand (O) or instruction (I) miss. FIG. 20 illustrates entry into an exceptions routine after the PTW miss routine of FIG. 19 fails to locate the PTW in memory.

PROGRAM LISTING

Attached hereto and comprising a part of the specification is a listing of microinstructions for various routines as stored in the Control Store 18. The defined instructions are provided in conventional manner in read-only memories (ROMs).

The attached IOPP firmware table of contents on page 1 of the printout identifies the Control Store location, routine name, and length (in octal and decimal). The location is the address (in octal) of the first instruction of the routine in the Control Store. The final location of 777 in octal is equivalent to location 512 in decimal, the maximum capacity of the Control Store.

The basic micro-operations are defined on pages 2–6 with the micro-op defined by the 54 bit octal bit pattern in the left column, the name of the micro-op, and the micro-code (MC) definition giving the number of the starting bit, the number of bits (in decimal) and the value of the bits (in octal). Macro-ops, which comprise micro-ops and/or other macro-ops, are defined on pages 7–12.

Based on these definitions, the IOPP firmware listings begin on page 16. The left most four digits define the Control Store location and the remaining eighteen bits are the location contents, in octal, defining the specific instruction. The firmware execution listings continue through page 77. Finally, the Pathfinder addresses and Control Store cross-references are given beginning on page 82.

We claim:

1. A processor for use in an input-output processing system which performs communication and control functions in a larger data processing system comprising:
    data input means, data-in register means, instruction register means, control store addressing switch means, control store means, a general register scratchpad, a first operand switch, a second operand switch, adder/shifter means, working register means, a page table word scratchpad, process state and process control register means, result crossbar means, and data-out register means;
    a. said instruction register means, responsive to said data input means and said control store means, receives and stores a plurality of instructions to be executed;
    b. said second operand switch, responsive to data from said data-in register means, displacement and values from said instruction register means, and instruction counter increments and constants from said control store means, provides operands to said adder/shifter means and said page table word scratchpad;
    c. said control store means, responsive to said instruction register means and said control store addressing switch means, stores addressable microinstructions including standard and execution sequences of microinstructions corresponding to specific instructions;
    d. said adder/shifter means, responsive to said first operand switch and said second operand switch, performs address formation, arithmetic computations, and data manipulations required for instruction execution;
    e. said page table word scratchpad, addressed by said working register means and responsive to said second operand switch stores page table words; said page table word scratchpad output is then concatenated with a portion of said working register means to develop absolute addresses;
    f. said control store addressing switch means, responsive to said instruction register means, addresses said control store means and calls microinstructions to perform a return address request, a next address request, an exception/interrupt routine request, and a page table word miss indication;
    g. said result crossbar means, responsive to said page table word scratchpad, said general register scratchpad, said process state and process control register means and said adder/shifter means, provides outputs to said data-out register means and said working register means and to an operator display panel;
    h. said data-out register means, responsive to said result crossbar means, provides data outputs to other components of the data processing system;
    i. said working register means, responsive to said result crossbar means, stores a temporary instruction count, data being processed, and memory addresses and also provides an address output and data output;
    j. said general register scratchpad, responsive to said control store means and said working register store means, further comprises an instruction counter, a page table base register, and a plurality of general registers for providing inputs to said first operand switch in said result crossbar means;
    k. said first operand switch, responsive to said working register means and said general register scratchpad, providing operands to said adder/shifter means;
    l. said process state and process control register means, responsive to said working register means, controls and monitors processor operation and provides inputs to said result crossbar means;
    m. said data-in register means, responsive to said data input means, provides inputs to said second operand switch.

2. A processor as defined by claim 1 including a control store output register for storing a microinstruction received from said control store means during processor operation.

3. A processor as defined by claim 1 and including in said control store addressing switch means, means for addressing said control store in response to a standard sequence notation and execution sequence in an instruction to be executed.

4. A processor as defined by claim 1 including as an input to said control store addressing switch means an execution address register for unique microinstruction sequences, a next address register, and a return address register.

5. A processor as defined by claim 4 and including adder means for receiving the current control store address and incrementing said address to provide the next address for said next address register.

6. A processor as defined by claim 5 and further including skip count means connected to said adder means for incrementing said current address by several counts.

7. A processor as defined by claim 1 including a key register connected with said page table word scratchpad for identifying that the accessed page table word is assigned to the current program being executed.

8. A processor as defined by claim 1 including an address switch responsive to the microinstruction being executed for addressing said general register scratchpad.

* * * * *